(12) United States Patent
Fan et al.

(10) Patent No.: US 12,008,179 B2
(45) Date of Patent: Jun. 11, 2024

(54) ELECTRONIC SUBSTRATE AND ELECTRONIC DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Cong Fan, Beijing (CN); Yu Wang, Beijing (CN); Kemeng Tong, Beijing (CN); Fan He, Beijing (CN); Xiangdan Dong, Beijing (CN); Hongwei Ma, Beijing (CN); Mengmeng Du, Beijing (CN); Xuwu Hu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/754,705

(22) PCT Filed: May 18, 2021

(86) PCT No.: PCT/CN2021/094251
§ 371 (c)(1),
(2) Date: Apr. 8, 2022

(87) PCT Pub. No.: WO2022/083115
PCT Pub. Date: Apr. 28, 2022

(65) Prior Publication Data
US 2024/0077963 A1 Mar. 7, 2024

(30) Foreign Application Priority Data

Oct. 22, 2020 (CN) .......................... 202011137662.5

(51) Int. Cl.
G06F 3/041 (2006.01)
G06F 3/044 (2006.01)

(52) U.S. Cl.
CPC .......... *G06F 3/0412* (2013.01); *G06F 3/0445* (2019.05); *G06F 3/0448* (2019.05); *G06F 2203/04103* (2013.01)

(58) Field of Classification Search
CPC .... G06F 3/0412; G06F 3/0445; G06F 3/0448; G06F 2203/04103
See application file for complete search history.

(56) References Cited

U.S. PATENT DOCUMENTS 10,579,200 B2 3/2020 Liu et al.
10,891,883 B2 1/2021 Jung
(Continued)

FOREIGN PATENT DOCUMENTS

CN 108108057 A 6/2018
CN 110021641 A 7/2019
(Continued)

OTHER PUBLICATIONS

USPTO NFOA dated Aug. 4, 2022 in connection with U.S. Appl. No. 17/488,407.

*Primary Examiner* — Amit Chatly

(57) ABSTRACT

An electronic substrate and an electronic device are provided. The electronic substrate includes a first functional region, a second functional region, and a peripheral region; the first functional region includes an opening, the second functional region is in the opening, and the peripheral region includes an opening peripheral region between the first functional region and the second functional region; the electronic substrate includes a base substrate and a detection trace structure on the base substrate; the detection trace structure includes a first conductive trace and a second conductive trace which are in the opening peripheral region, (Continued)

and the first conductive trace and the second conductive trace respectively extend from a first position reversely along an edge of the second functional region and respectively partially surround the second functional region, the first conductive trace and the second conductive trace are spaced apart from each other in the first position.

19 Claims, 11 Drawing Sheets

(56) References Cited

U.S. PATENT DOCUMENTS

| | | |
|---|---|---|
| 11,360,625 B2 | 6/2022 | Deng et al. |
| 2020/0175901 A1* | 6/2020 | Lee .................... G09G 3/006 |
| 2020/0249796 A1 | 8/2020 | Hara et al. |
| 2020/0273919 A1* | 8/2020 | Ding .................... H10K 50/841 |
| 2020/0278312 A1* | 9/2020 | Jeong ................ G01R 31/2837 |
| 2020/0401273 A1* | 12/2020 | Bang .................... G06F 3/0443 |
| 2021/0257592 A1* | 8/2021 | Lee .................... G06F 3/04164 |

FOREIGN PATENT DOCUMENTS

| | | |
|---|---|---|
| CN | 110727373 A | 1/2020 |
| CN | 111106151 A | 5/2020 |
| CN | 111128064 A | 5/2020 |
| CN | 112256150 A | 1/2021 |

* cited by examiner

ELECTRONIC SUBSTRATE AND ELECTRONIC DEVICE

This application is a National Stage of International Application No. PCT/CN2021/094251, filed May 18, 2021, which claims priority to the Chinese patent application No. 202011137662.5 filed on Oct. 22, 2020, both of which are hereby incorporated by reference in their entireties.

TECHNICAL FIELD

Embodiments of the present disclosure relate to an electronic substrate and an electronic device.

BACKGROUND

With the rapid development and wide application of electronic products, how to reduce the production cost of the electronic products and how to improve the yield of the electronic products has become one of the key issues to be solved at present. For example, a detection circuit may be used to detect the presence of problems, such as a disconnection of a circuit and faults of the circuit in the electronic products, thus improving the yield of the electronic products and reducing the production cost of the electronic products.

SUMMARY

At least one embodiment of that present disclosure provide an electronic substrate, the electronic substrate comprises a first functional region, a second functional region, and a peripheral region surrounding the first functional region; the first functional region comprises an opening, and the second functional region is in the opening; the peripheral region comprises an opening peripheral region at least partially in the opening, the opening peripheral region at least partially surrounds the second functional region and is between the second functional region and the first functional region; the electronic substrate comprises a base substrate and a detection trace structure on the base substrate, the detection trace structure is along an edge of the peripheral region, a first end of the detection trace structure is configured to be connected to a detection signal source, and a second end of the detection trace structure is configured to be connected to a detection circuit; the detection trace structure comprises a first conductive trace and a second conductive trace in the opening peripheral region and at least partially surrounding the second functional region, the first conductive trace and the second conductive trace respectively extend from a first position along an edge of the second functional region in a reverse direction and respectively partially surround the second functional region, and the first conductive trace and the second conductive trace are spaced apart from each other in the first position, a contour of an orthographic projection of the first conductive trace and an orthographic projection of the second conductive trace on the base substrate at least partially surround an orthographic projection of the second functional region on the base substrate, so that the orthographic projection of the second functional region on the base substrate is in a region enclosed by the orthographic projection of the first conductive trace and the orthographic projection of the second conductive trace on the base substrate; and the electronic substrate comprises a first electrode layer, an insulating layer and a second electrode layer that are sequentially stacked on the base substrate, the first conductive trace is in the first electrode layer and the second conductive trace is in the second electrode layer, and the first conductive trace and the second conductive trace are spaced apart from each other in a direction perpendicular to the base substrate by the insulating layer and electrically connected to each other at a second position.

For example, in the electronic substrate provided by an embodiment of the present disclosure, the orthographic projection of the first conductive trace on the base substrate and the orthographic projection of the second conductive trace on the base substrate overlap each other at least partially at the second position, and the first conductive trace and the second conductive trace are electrically connected to each other in the second position by an over-hole structure at least penetrating through the insulating layer.

For example, in the electronic substrate provided by an embodiment of the present disclosure, a spacing is between the second position and the first position in a circumferential direction along the edge of the second functional region.

For example, in the electronic substrate provided by an embodiment of the present disclosure, along the circumferential direction of the edge of the second functional region, the spacing between the first position and the second position is greater than or equal to ¼ of a circumference of the edge of the second functional region.

For example, in the electronic substrate provided by an embodiment of the present disclosure, the opening peripheral region comprises a first cofferdam region, a second cofferdam region and a spacing region; the first cofferdam region at least partially surrounds the first functional region, the spacing region at least partially surrounds the first cofferdam region, and the second cofferdam region at least partially surrounds the spacing region; the electronic substrate comprises a first cofferdam structure and a second cofferdam structure, the first cofferdam structure is in the first cofferdam region and the second cofferdam structure is in the second cofferdam region; the first conductive trace is at least between the second cofferdam region and the second functional region, the second conductive trace is at least between the second cofferdam region and the second functional region; and in the direction perpendicular to the base substrate, the first conductive trace and the second conductive trace are on a side of the first cofferdam structure and the second cofferdam structure away from the base substrate.

For example, the electronic substrate provided by an embodiment of the present disclosure further comprises at least one first dummy electrode pattern and at least one second dummy electrode pattern, which are in the opening peripheral region; the at least one first dummy electrode pattern and the at least one second dummy electrode pattern are between the first functional region and the first cofferdam region; the at least one first dummy electrode pattern is in the first electrode layer and is spaced apart and insulated from the first conductive trace and the second conductive trace, respectively; and the at least one second dummy electrode pattern is in the second electrode layer and is spaced apart and insulated from the first conductive trace and the second conductive trace, respectively.

For example, in the electronic substrate provided by an embodiment of the present disclosure, an orthographic projection of the at least one first dummy electrode pattern on the base substrate at least partially surrounds the first functional region, and an orthographic projection of the at least one second dummy electrode pattern on the base substrate at least partially surrounds the first functional region; and the orthographic projection of the at least one first dummy electrode pattern on the base substrate is on a side of the orthographic projection of the at least one second dummy electrode pattern on the base substrate away from the first functional region.

For example, the electronic substrate provided by an embodiment of the present disclosure, further comprises a connection trace pattern; the connection trace pattern is at least in the opening peripheral region and partially surrounds the first functional region, and the first end and the second end of the connection trace pattern respectively extend into the first functional region; in the opening peripheral region, an orthographic projection of at least part of the connection trace pattern on the base substrate is on a side of the at least one first dummy electrode pattern on the base substrate away from the second functional region; and the connection trace pattern and the at least one first dummy electrode pattern are spaced apart and insulated from each other, and the connection trace pattern partially overlaps and is insulated from the at least one second dummy electrode pattern in the direction perpendicular to the base substrate.

In the opening peripheral region, the orthogonal projection of the connection trace pattern on the base substrate is located between the orthogonal projection of the at least one first dummy electrode pattern on the base substrate and the orthogonal projection of the at least one second dummy electrode pattern on the base substrate, and the connection trace pattern and the at least one first dummy electrode pattern are spaced and insulated from each other.

For example, in the electronic substrate provided by an embodiment of the present disclosure, the connection trace pattern is in the first electrode layer or the second electrode layer.

For example, in the electronic substrate provided by an embodiment of the present disclosure, along the circumferential direction of the edge of the second functional region, a first end of the connection trace pattern is spaced between the first position and the second position, respectively, and a second end of the connection trace pattern is spaced between the first position and the second position, respectively.

For example, in the electronic substrate provided by an embodiment of the present disclosure, the first cofferdam structure comprises at least one layer of insulating structure, and the second cofferdam structure comprises at least one layer of insulating structure.

For example, in the electronic substrate provided by an embodiment of the present disclosure, the first conductive trace and the second conductive trace form an arcuate trace structure comprising a projection, and the projection is at least in the second position.

For example, in the electronic substrate provided by an embodiment of the present disclosure, the second position is at least between the first cofferdam region and the first functional region.

For example, in the electronic substrate provided by an embodiment of the present disclosure, the first conductive trace and the second conductive trace form an arcuate trace structure, and the second position is at least between the second cofferdam region and the second functional region.

For example, in the electronic substrate provided by an embodiment of the present disclosure, the detection trace structure further comprises a third conductive trace and a fourth conductive trace which are in the opening peripheral region, the third conductive trace is in the first electrode layer and is connected to an end of the first conductive trace near the first position, the fourth conductive trace is in the second electrode layer and is connected to an end of the second conductive trace near the first position, and the third conductive trace and the fourth conductive trace respectively extend in a straight line substantially from the first position along a direction away from a center of the second functional region.

For example, in the electronic substrate provided by an embodiment of the present disclosure, the detecting trace structure further comprises a first trace portion and a second trace portion; the first trace portion comprises a first connection end and a second connection end, the first connection end of the first trace portion acts as a first end or a second end of the detection trace structure, the second connection end of the first trace portion is configured to connect to the third conductive trace; the second trace portion comprises a first connection end and a second connection end, the first connection end of the second trace portion acts as a second end or a first end of the detection trace structure, the second connection end of the second trace portion is configured to connect to the fourth conductive trace; and the first trace portion, the third conductive trace, the first conductive trace, the second conductive trace, the fourth conductive trace and the second trace portion are connected to each other in sequence between the detection signal source and the detection circuit.

For example, in the electronic substrate provided by an embodiment of the present disclosure, the first trace portion comprises a fifth conductive trace at least partially in the first functional region, the second trace portion comprises a sixth conductive trace at least partially in the first functional region, the fifth conductive trace and the sixth conductive trace are in the first electrode layer, the fifth conductive trace is connected to the third conductive trace and is integrally provided, and the sixth conductive trace and the fourth conductive trace are electrically connected to each other by an over-hole structure at least penetrating through the insulating layer.

For example, in the electronic substrate provided by an embodiment of the present disclosure, the detection trace structure extends substantially along an edge contour of a side of the peripheral region away from the first functional region.

For example, in the electronic substrate provided by an embodiment of the present disclosure, the electronic substrate comprises a touch substrate, the first functional region is configured as a touch region, the touch substrate comprises a touch electrode structure on the base substrate, the touch electrode structure is at least partially in the first functional region, and a first portion of the touch electrode structure is in the first electrode layer and a second portion of the touch electrode structure is in the second electrode layer.

At least one embodiment of the present disclosure also provides an electronic device, comprising the electronic substrate according to any embodiment of the present disclosure, and the electronic substrate is configured as a display substrate or a touch substrate.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1:
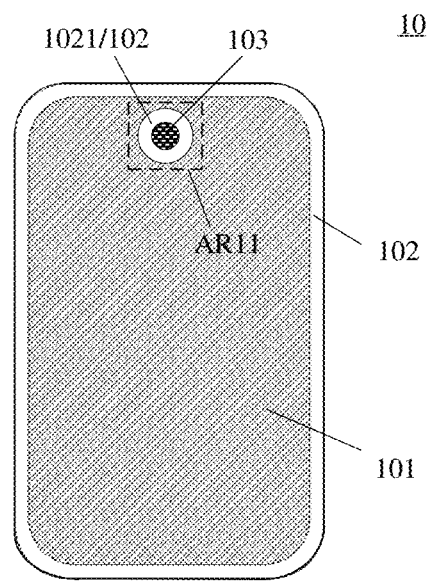
FIG. 1 is a schematic plan diagram of an electronic product with a display function.

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At present, in order to detect any adverse effects on a device performance or a circuit connection in an electronic product during a manufacturing process, for example whether a cutting process of an electronic substrate has caused a disconnection of the circuit or a poor contact of traces on the electronic substrate, a circle of metal trace for Panel Crack Detection (PCD) is usually arranged along an outer edge of the electronic product in a frame region of the electronic product.

Compared to other traces in the electronic product, the metal trace is usually disposed in a position closest to the outer edge of the electronic product, for example in a position closest to the cutting line in the case where the electronic substrate is cut. Therefore, by detecting a transmission of an electrical signal on the metal trace, it is possible to determine whether the metal trace has an adverse effect, such as a disconnection of the circuit or poor contact during the manufacturing process (such as cutting). Further, it is possible to determine whether other traces or devices in the electronic product are adversely affected, such as a disconnection of the circuit or poor contact, during the manufacturing process. For example, in the case where it is determined that the electrical signal on the metal trace may be transmitted normally, it may be basically determined that there is no adverse effect, such as a disconnection of the circuit, on the circuit connection in the electronic product during the cutting process. Generally, based on the circuit layout in the frame region and the narrow frame design requirements of the electronic product, the above-mentioned metal trace in the frame region usually adopt a single-layer trace structure.

With the wide application of the electronic product, user's requirements for, for example, functionality and appearance of the electronic product are further increased. In order to meet the different practical requirements of users, the appearance or the functional region of the electronic product sometimes need to be designed in an irregular shape or a special shape. However, for the electronic product with the irregular shape or the special shape, it is often difficult to achieve a good detection result with the metal trace with the single-layer trace structure.

Figure 2A:
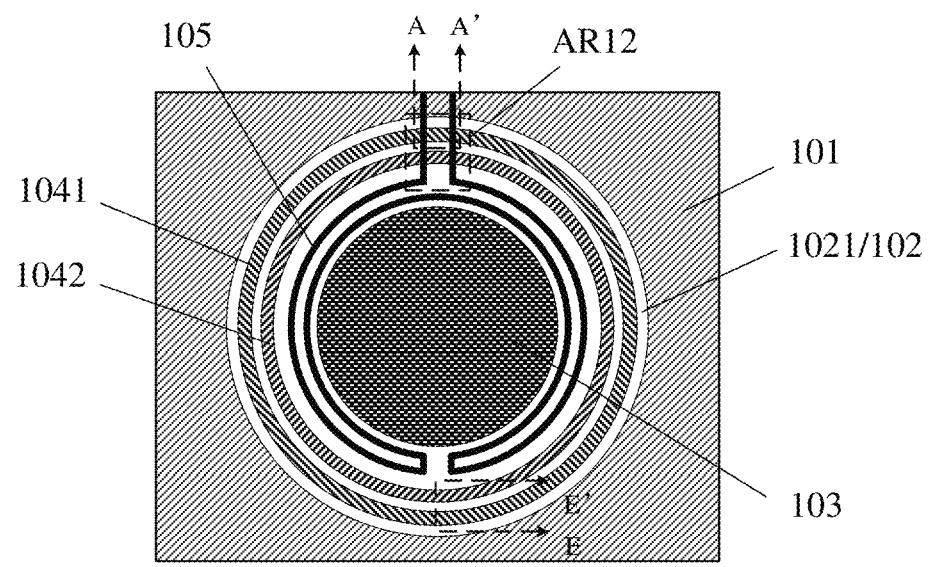
FIG. 2A is a partially enlarged schematic diagram of a region AR11 as shown in FIG. 1.
Figure 2B:
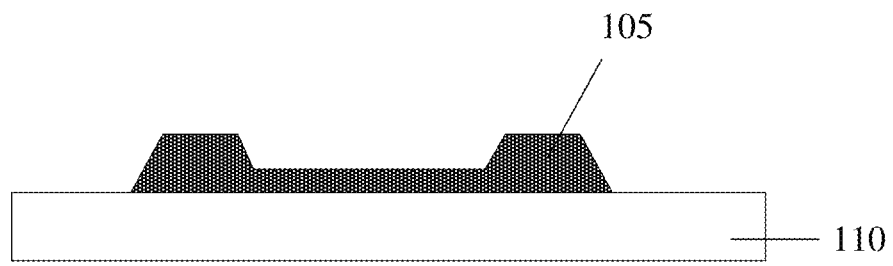
FIG. 2B is a schematic diagram of a partial cross-sectional structure along a line AN as shown in FIG. 2A.
Figure 2C:
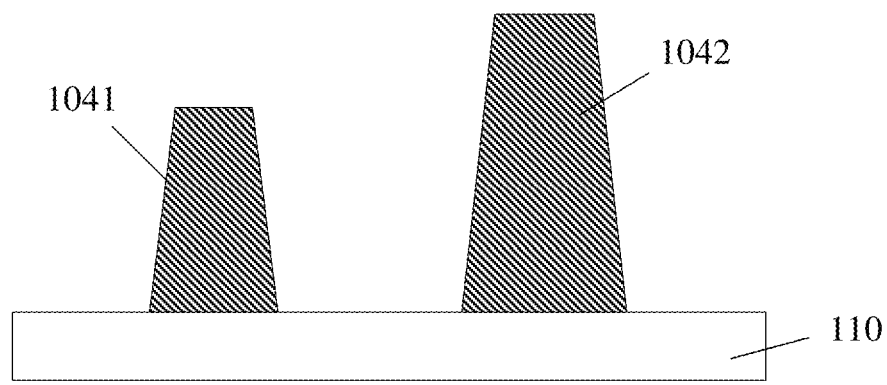
FIG. 2C is a schematic diagram of a partial cross-sectional structure along a line EE' as shown in FIG. 2A.

FIG. 1 is a schematic plan diagram of an electronic product with a display function, FIG. 2A is a partially enlarged schematic diagram of a region AR11 as shown in FIG. 1, FIG. 2B is a schematic diagram of a partial cross-sectional structure along a line AN as shown in FIG. 2A, and FIG. 2C is a schematic diagram of a partial cross-sectional structure along a line EE' as shown in FIG. 2A.

For example, as shown in FIG. 1 and FIGS. 2A-2C, the electronic product 10 includes a display region 101 and a frame region 102 surrounding the display region 101. The display region 101 is designed to have an irregular shape, such as an opening obtained by cutting, and the electronic product 10 may arrange an element, such as a camera, a distance sensor, etc. in the opening of the display region 101, i.e. the device is exposed through the opening to receive external light, for example may be arranged in a region 103 as shown in FIG. 1, thus contributing to the narrow frame design of the electronic product 10.

In order to avoid adverse effects caused by, for example various functional layers of the display device, on the display region 101, two cofferdam structures 1041 and 1042 with different heights may be provided in the frame region 102 surrounding the display region 101 (for example, the maximum heights of the cofferdam structures 1041 and 1042 relative to the base substrate 110 are different as shown in FIG. 2C), and an organic film layer, such as a pixel definition layer, a flat layer, etc. between the two cofferdam structures 1041 and 1042 are removed as far as possible to form a "trench" region. Furthermore, after encapsulation, a formed encapsulation layer may effectively block the penetration of, for example, water vapor or oxygen into the interior of, for example, display devices or other devices in the display region 101 of the electronic product 10.

When preparing the metal trace 105 for the above-mentioned panel disconnection detection in the frame region 102, because the metal trace 105 need to be arranged at a position, for example, close to the cutting line, the metal trace 105 in the frame region 102 need to be disposed on a side of the cofferdam structures 1041 and 1042 away from the display region 101 to improve the accuracy and reliability of the detection results obtained by using the metal trace 105.

Because the cutting process is also required to form the region 103 in the opening, therefore, in the part of the frame region 1021 surrounding the region 103, the metal trace 105 for panel disconnection detection also needs to be set to determine that the cutting process used to form the region 103 does not cause the adverse effect, such as a disconnection of the circuit or a poor contact to the trace or devices located near the region 103 in the electronic product 10.

However, due to the small size of this part of frame region 1021 located between the display region 101 and the region 103, the spacing between the metal trace 105 and the cofferdam structures 1041 and 1042 is also relatively small. For example, the spacing between the metal trace 105 and the adjacent cofferdam structure 1042 is relatively small. The film thickness of the cofferdam structures 1041 and 1042 is often greater, for example greater than or even much greater than the film thickness of the metal trace 105, and thus there is often a tendency for a large amount of metal residue to remain when forming the metal trace 105 due to factors, such as film breakage. For example, as shown in FIG. 2A and FIG. 2B, in the case where, for example, an exposure process is carried out to form the metal trace 105, a large amount of metal material is likely to remain in the "trench" region formed between the cofferdam structures 1041 and 1042, thereby resulting in a short circuit between the traces in this part of the frame region 1021.

For example, in the region AR12 as shown in FIG. 2A, a left metal trace 105 and a right metal trace 105, which extend in the same direction in parallel, need to extend from a side of the cofferdam structures 1041 and 1042 away from the display region 101 (i.e., near the region 103) to a side of the cofferdam structures 1041 and 1042 near the display region 101 and cover the cofferdam structures 1041 and 1042, thus likely causing a large amount of metal residue phenomenon as shown in FIG. 2B when the left metal trace 105 and the right metal trace 105 are formed. For example, a large amount of metal residue tends to be generated on both the left and right sides of the left metal trace 105 and the right metal trace 105, and due to the very close spacing between the aforementioned left metal trace 105 and right metal trace 105 located in region AR 12, a situation may arise between the left metal trace 105 and the right metal trace 105 as shown in FIG. 2B, resulting in a short circuit between the left metal trace 105 and the right metal trace 105 caused by the residual metal material, causing it to be difficult to effectively detect the signal transmission in this part of the frame region 1021 surrounding the region 103 via the metal trace 105.

At least one embodiment of the present disclosure provides an electronic substrate. The electronic substrate includes a first functional region, a second functional region, and a peripheral region surrounding the first functional region; the first functional region comprises an opening, and the second functional region is in the opening; the peripheral region comprises an opening peripheral region at least partially in the opening, the opening peripheral region at least partially surrounds the second functional region and is between the second functional region and the first functional region; the electronic substrate comprises a base substrate and a detection trace structure on the base substrate, the detection trace structure is along an edge of the peripheral region, a first end of the detection trace structure is configured to be connected to a detection signal source, and a second end of the detection trace structure is configured to be connected to a detection circuit; the detection trace structure comprises a first conductive trace and a second conductive trace in the opening peripheral region and at least partially surrounding the second functional region, the first conductive trace and the second conductive trace respectively extend from a first position along an edge of the second functional region in a reverse direction and respectively partially surround the second functional region, and the first conductive trace and the second conductive trace are spaced apart from each other in the first position, a contour of an orthographic projection of the first conductive trace and an orthographic projection of the second conductive trace on the base substrate at least partially surround an orthographic projection of the second functional region on the base substrate, so that the orthographic projection of the second functional region on the base substrate is in a region enclosed by the orthographic projection of the first conductive trace and the orthographic projection of the second conductive trace on the base substrate; and the electronic substrate comprises a first electrode layer, an insulating layer and a second electrode layer that are sequentially stacked on the base substrate, the first conductive trace is in the first electrode layer and the second conductive trace is in the second electrode layer, and the first conductive trace and the second conductive trace are spaced apart from each other in a direction perpendicular to the base substrate by the insulating layer and electrically connected to each other at a second position.

In the electronic substrate provided by the above embodiments of the present disclosure, by providing the first conductive trace and the second conductive trace located in the opening peripheral region in different layers of the first electrode layer and the second electrode layer, respectively, and by spacing the first conductive trace and the second conductive trace from each other in a direction perpendicular to the base substrate by the insulating layer, short circuits or other electrical defects in the electronic substrate caused by factors such as material residues in the formation of the first conductive trace and the second conductive trace may be effectively reduced or avoided. As a result, the signal transmission in the opening peripheral region may be effectively detected by the first conductive trace and second conductive trace, the accuracy and reliability of the detection results obtained using the detection traces can be improved, thereby increasing the yield of the electronic substrate, reducing production costs, and improving the reliability and stability of the electronic substrate, and optimizing the overall performance of the electronic substrate.

In the following, embodiments of the present disclosure will be described in detail with reference to the drawings. It should be noted that the same reference symbols in the different drawings will be used to refer to the same components that have been described.

Figure 3:
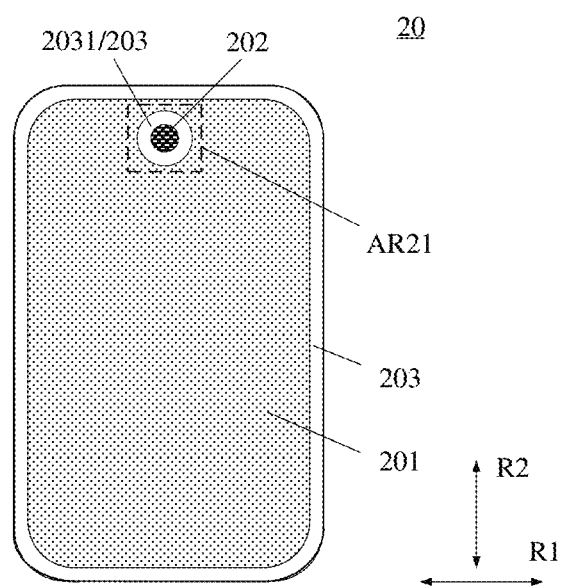
FIG. 3 is a schematic plan diagram of an electronic substrate provided by some embodiments of the present disclosure.
Figure 4A:
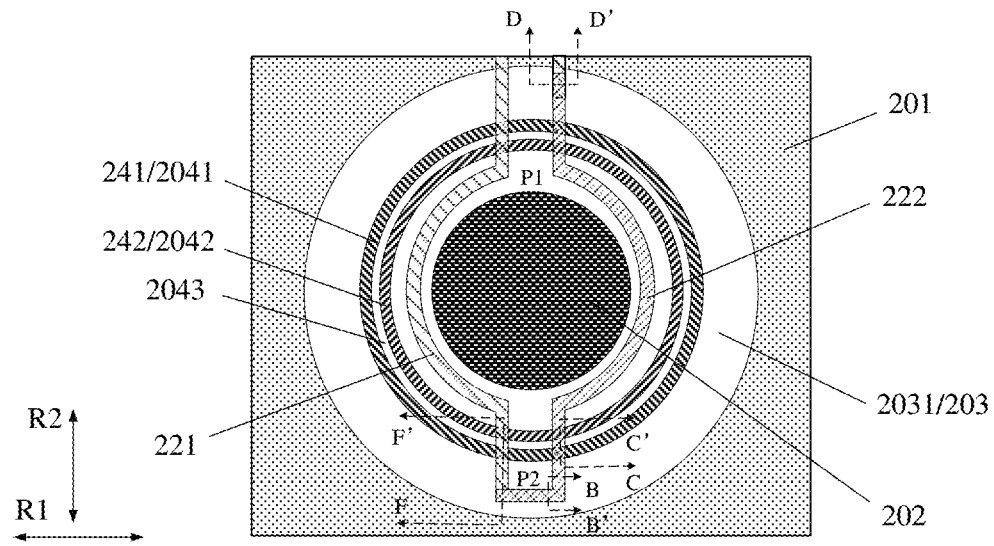
FIG. 4A is a partially enlarged schematic diagram of an example of a region AR21 as shown in FIG. 3.
Figure 4B:
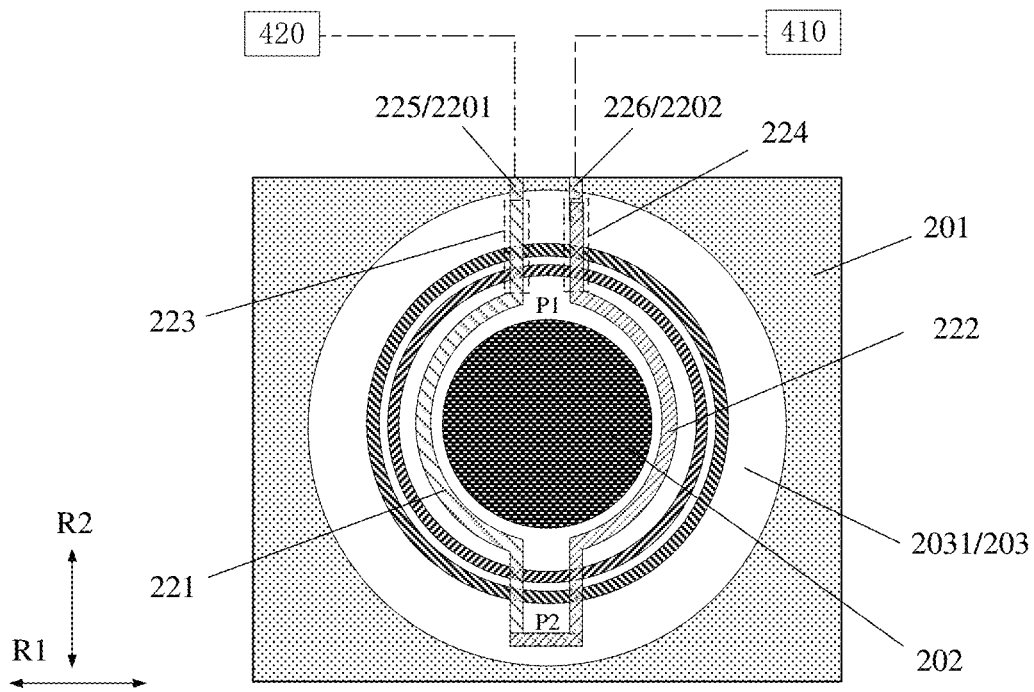
FIG. 4B is a schematic diagram of a connection method of a first conductive trace and a second conductive trace as shown in FIG. 4A.
Figure 5A:
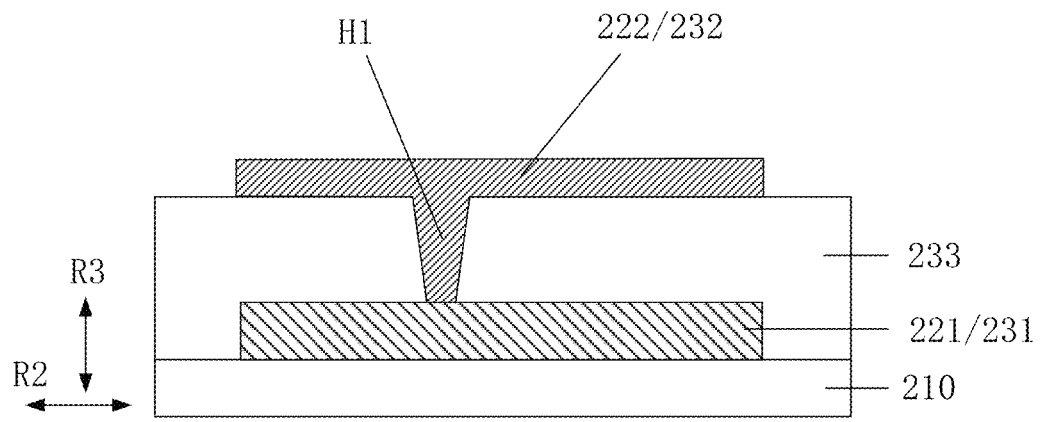
FIG. 5A is a schematic diagram of a partial cross-sectional structure along a line BB' as shown in FIG. 4A.

FIG. 3 is a schematic plan diagram of an electronic substrate provided by some embodiments of the present disclosure, FIG. 4A is a partially enlarged schematic diagram of an example of a region AR21 as shown in FIG. 3, FIG. 4B is a schematic diagram of a connection method of the first conductive trace and the second conductive trace as shown in FIG. 4A, and FIG. 5A is a schematic diagram of a partial cross-sectional structure along a line BB' as shown in FIG. 4A.

For example, as shown in FIG. 3 to FIG. 5A, the electronic substrate 20 includes a first functional region 201, a second functional region 202 and a peripheral region 203 surrounding the first functional region 201. For example, the first functional region 201 and the second functional region 202 may be configured to have the same functions, such as display, touch, etc., or may also be configured to have different functions respectively.

For example, taking the electronic substrate 20 being a display substrate as an example, the first functional region 201 is configured as a display region, and the second functional region 202 may be similarly configured as a display region, or may also be configured as a region with other functions different from the display function, such as a touch region, a camera region, etc.; for example, taking the electronic substrate 20 being a touch substrate as an example, the first functional region 201 is configured as a touch region, and the second functional region 202 may be similarly configured as a touch region, or may also be configured as a region with other functions different from the touch function, such as a display region, a camera region, etc.; for example, taking the electronic substrate 20 being a substrate having both a display function and a touch function as an example, the first functional region 201 is configured as a region with both a display function and a touch function, and the second functional region 202 may be configured as a region with other functions, such as a camera region, etc., none of which is specifically limited by the embodiments of the present disclosure.

The first functional region 201 includes an opening in which the second functional region 202 is located. For example, the opening may be a closed opening obtained by, for example, cutting in the electronic substrate 20 shown in FIG. 3; or, in some other embodiments, the opening may also be a non-closed opening obtained by, for example, cutting in the electronic substrate 30 shown in FIG. 8 and formed on one side (or multiple sides) of the first functional region 201. In the region where the opening is located, for example in the second functional region 202 located in the opening, an element such as a camera, a distance sensor etc., may be arranged, thus contributing to the narrow frame design of the electronic substrate.

Figure 8:
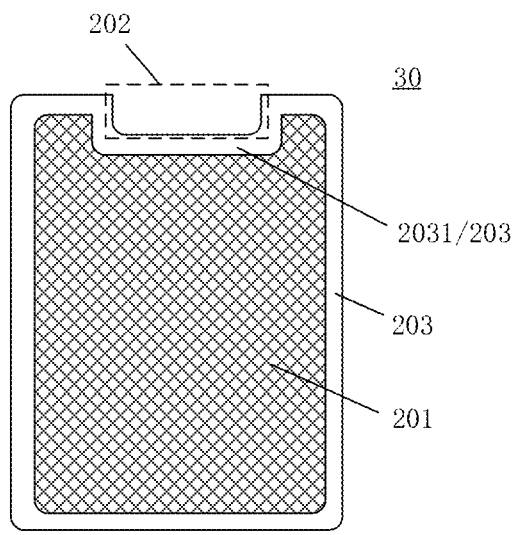
FIG. 8 is a schematic plan diagram of another electronic substrate provided by some embodiments of the present disclosure.

It should be noted that embodiments of the present disclosure do not specifically limit the shape or contour, etc., of the electronic substrate 20. For example, the electronic substrate provided by embodiments of the present disclosure may be a square as shown in FIG. 3 or FIG. 8, or it may be other suitable regular or irregular shapes such as a circle, a regular hexagon, a regular octagon, etc., and the embodiments of the present disclosure are not limited thereto.

It should be noted that the embodiments of the present disclosure illustrate the structure and function of the electronic substrate 20, etc., by taking the closed opening shown in FIG. 3 as an example, but this case does not constitute a limitation of the present disclosure. And the embodiments of the present disclosure are not limited to the location, form, etc., of the opening in the electronic substrate 20.

It should be noted that embodiments of the present disclosure are not specifically limited to the number, shape or contour of the openings, etc. For example, the number of opening in embodiments of the present disclosure may be one as shown in FIG. 3, or may be two, three or more; the opening in embodiments of the present disclosure may be circular as shown in FIG. 3, or may be other suitable regular or irregular shapes such as a square, a regular hexagon, a regular octagon, etc., none of which is specifically limited by the embodiments of the present disclosure.

The peripheral region 203 includes an opening peripheral region 2031 at least partially disposed in the opening, the opening peripheral region 2031 at least partially surrounding the second functional region 202 and disposed between the second functional region 202 and the first functional region 201. For example, in the embodiment shown in FIG. 3, the opening peripheral region 2031 is located entirely in the opening, and the opening peripheral region 2031 surrounds all the second functional region 202. For example, in the embodiment shown in FIG. 8, the opening peripheral region 2031 is only partially disposed in the opening, and the opening peripheral region 2031 surrounds a portion of the second functional region 202 along a portion of an edge of the second functional region 202.

As shown in FIG. 3 to FIG. 5A, the electronic substrate 20 includes a base substrate 210 and a detection trace structure (for example, including a first conductive trace 221 and a second conductive trace 222) disposed on the base substrate 210. A first end of the detection trace structure is configured to be connected to the detection signal source 410 and a second end of the detection trace structure is configured to be connected to the detection circuit 420, whereby it is determined whether the detection trace structure may form a normal signal transmission path between the detection signal source 410 and the detection circuit 420 to determine whether the detection trace structure is affected by, for example, a disconnection or a poor contact of the circuit.

For example, depending on the function of the electronic substrate 20, the electronic substrate 20 may also include a driving circuitdisplay driving circuit layer and a light-emitting element layer, etc. (corresponding to the display substrate), or the electronic substrate 20 may also include a touch circuit layer, etc. (corresponding to the touch substrate). The detection trace structure may be formed using the same manufacturing process as one or more of the respective film layers included in, for example, the driving circuitdisplay driving circuit layer, the light-emitting element layer or the touch control circuit layer, or may also be prepared separately, none of which is limited by the embodiments of the present disclosure.

For example, the detection trace structure of the electronic substrate 20 may be prepared prior to the cutting process, and after the preparation is completed, it is checked to determine whether the detection trace structure is capable of forming a normal signal transmission path, and if the normal signal transmission path can be formed, it enters the following process. The detection trace structure is provided along the edge of the peripheral region 203, for example along a cutting edge of the peripheral region 203. For example, after the cutting process of the electronic substrate 20 is finished, the detection trace structure is detected, so that by determining the signal transmission on the detection trace structure, it may be determined whether the manufacturing process, such as the cutting process or other manufacturing process, etc., of the electronic substrate 20, has caused adverse effects on the detection trace structure, such as a disconnection or a poor contact of the circuit, etc. Further, it can be determined based on the detection result of the detection of the trace structure whether other traces or devices in the electronic substrate 20 are adversely affected by, for example, a disconnection or a poor contact of the circuit during the manufacturing process.

The detection trace structure includes a first conductive trace 221 and a second conductive trace 222 disposed in the opening peripheral region 2031 and at least partially surrounding the second functional region 202. For example, as shown in FIG. 4A, the first conductive trace 221 and the second conductive trace 222 substantially surround all other regions of the second functional region 202 except for an upper portion. The first conductive trace 221 and the second conductive trace 222 respectively extend from the first position P1 along an edge of the second functional region 202 in a reverse direction and respectively partially around the second functional region 202. For example, as shown in FIG. 4A, the first conductive trace 221 extends from the first position P1 along the edge of the second functional region 202 in a counterclockwise direction to surround a left edge of the second functional region 202. The second conductive trace 222 extends from the first position P1 along the edge of the second functional region 202 in a clockwise direction to surround a right edge of the second functional region 202. The first conductive trace 221 and the second conductive trace 222 are spaced apart from each other at the first position P1; for example, as shown in FIG. 4A, at the first position P1, the first conductive trace 221 and the second conductive trace 222 are spaced apart from each other in the first direction R1.

A contour of an orthographic projection of the first conductive trace 221 and an orthographic projection of the second conductive trace 222 on the base substrate 210 at least partially surrounds an orthographic projection of the second functional region 202 on the base substrate 210. For example, as shown in FIG. 4A, the contour of the orthographic projection of the first conductive trace 221 and the orthographic projection of the second conductive trace 222 on the base substrate 210 surrounds other portions, other than the upper portion, of the orthographic projection of the second functional region 202 on the base substrate 210, such that the orthographic projection of the second functional region 202 on the base substrate 210 is located in a region surrounded by the orthographic projection of the first conductive trace 221 and the orthographic projection of the second conductive trace 222 on the base substrate 210. For example, as shown in FIG. 4A, the second functional region 202 is located within a region surrounded by a arcuate trace structure formed by the first conductive trace 221 and the second conductive trace 222.

It should be noted that the first position P1 may refer to a certain point or may also refer to a certain region or a certain portion. For example, taking the embodiment as shown in FIG. 4A as an example, the first position P1 may refer to a central point in the first direction R1 between an upper end of the first conductive trace 221 and an upper end of the second conductive trace 222, for example, a midpoint of a connection between the upper end of the first conductive trace 221 and the upper end of the second conductive trace 222.

It should be noted that the first conductive trace 221 and the second conductive trace 222 may respectively extend along the edge of the second functional region 202 in a generally smooth circular arc shape as shown in FIG. 4A, or it may also extend along the edge of the second functional region 202 in a folded shape, a serrated shape or other suitable shape. The embodiments of the present disclosure are not limited to the specific extension shape of the first conductive trace 221 and the specific extension shape of the second conductive trace 222, as long as the overall extension direction of the first conductive trace 221 is in the extension direction along the edge of the second functional region 202 (for example in a circumferential direction) and the overall extension direction of the second conductive trace 222 may be in the extension direction along the edge of the second functional region 202 (for example in a circumferential direction).

As shown in FIG. 3 to FIG. 5A, the electronic substrate 20 includes a first electrode layer 231, an insulating layer 233 and a second electrode layer 232 that are sequentially stacked on the base substrate 210, the first conductive trace 221 is located in the first electrode layer 231 and the second conductive trace 222 is located in the second electrode layer 232, the first conductive trace 221 and the second conductive trace 222 are spaced apart from each other in the direction R3 perpendicular to the base substrate 210 through the insulating layer 233 and electrically connected to each other at the second position P2. Thus, by electrically connecting the first conductive trace 221 and the second conductive trace 222 to each other at the second position P2, the first conductive trace 221 and the second conductive trace 222 may be made to form a signal transmission path surrounding the second functional region 202, thereby enabling detection of the signal transmission condition within the opening peripheral region 2031 surrounding the second functional region 202 by using the detection trace structure.

In the embodiment of the present disclosure, on the basis of using the first conductive trace 221 and the second conductive trace 222 to detect the signal transmission in the opening peripheral region 2031 by using the detection trace structure, the first conductive trace 221 and the second conductive trace 222 are respectively disposed in different layers of the first electrode layer 231 and the second electrode layer 232, and the first conductive trace 221 and the second conductive trace 222 are spaced apart from each other in the direction R3 perpendicular to the base substrate 210 through the insulating layer 233, so that a short circuit phenomenon between the first conductive trace 221 and the second conductive trace 222 caused by, for example, material residues that may occur during preparation may be effectively reduced or avoided. As a result, the range of signal transmission that may be detected by the detection trace structure including the first conductive trace 221 and the second conductive trace 222 within the opening peripheral region 2031 may be increased, which is beneficial to realize the effective detection of signal transmission within the opening peripheral region 2031 by the detection trace structure. Furthermore, the accuracy and reliability of the detection results obtained by the detecting the trace structure may be improved, and it may be effectively determined whether the manufacturing process, such as the cutting process or other manufacturing process, has an adverse effect on the circuit connection of the detection trace structure, etc., and based on the detection results obtained, it may be further determined whether other circuit connections or signal transmission, etc. in the electronic substrate 20 are adversely affected during the manufacturing process. Thus, the yield of the electronic substrate 20 is improved, the manufacturing cost of the electronic substrate 20 is reduced, and the reliability and stability of the electronic substrate 20 are improved, and the overall performance of the electronic substrate 20 is optimized.

In some embodiments of the present disclosure, the first conductive trace 221 and the second conductive trace 222 include a metallic material, for example the first conductive trace 221 and the second conductive trace 222 may be a single metallic material, such as aluminum, molybdenum, copper, silver, or an alloy of metallic materials, such as aluminum, molybdenum, copper, silver, for example a silver-palladium-copper alloy material, etc. Thus, in the embodiments of the present disclosure, by using the insulating layer 233, the first conductive trace 221 in the first electrode layer 231 and the second conductive trace 222 in the second electrode layer 232 are spaced apart from each other in the direction R3 perpendicular to the base substrate 210, which is possible to attenuate or avoid the short circuit between the first conductive trace 221 and the second conductive trace 222 caused by metal residues that may occur due to the formation of the first conductive trace 221 and the second conductive trace 222. Therefore, it is beneficial to effectively and accurately detect the signal transmission condition of the detection trace structure in the opening peripheral region 2031 by means of the first conductive trace 221 and the second conductive trace 222.

For example, the material of the insulating layer 233 may include an inorganic insulating material, such as silicon oxide, silicon nitride, silicon nitride, etc., or may also include an organic insulating material, such as polyimide, polyphthalimide, polyphthalamide, acrylic resin, benzocyclobutene or phenolic resin, which are not specifically limited in the embodiments of the present disclosure.

In some embodiments of the present disclosure, the detection trace structure extends substantially along the contour of the edge of the side of the peripheral region 203 away from the first functional region 201, for example, it may extend substantially along the contour of the edge of the side of the peripheral region 203 formed by a cutting line, so that the detection trace structure may be used to more accurately and efficiently determine whether, for example, the cutting process or other manufacturing process of the electronic substrate 20 has an adverse effect on the circuit connection of the detection trace structure, etc., and based on the obtained detection results, it may be further determined whether other circuit connections or devices, etc. in the electronic substrate 20 are adversely affected during the manufacturing process.

For example, taking the first conductive trace 221 and the second conductive trace 222 located in the opening peripheral region 2031 as an example, the first conductive trace 221 and the second conductive trace 222 may extend substantially along the edge contour of a side of the opening peripheral region 2031 away from the first functional region 201, i.e., substantially along the edge contour of the side of the opening peripheral region 2031 near the second functional region 202, for example substantially along the edge contour of the second functional region 202. As a result, the first conductive trace 221 and the second conductive trace 222 may be provided closer to, for example, the position of the cutting line used to form the second functional region 202, thereby improving the accuracy of the signal transmission of the detection trace structure obtained by the first conductive trace 221 and the second conductive trace 222 within the opening peripheral region 2031, and thereby improving the accuracy and reliability of the detection results obtained by using the detection trace structure.

For example, as shown in FIG. 4A and FIG. 5A, the orthographic projection of the first conductive trace 221 on the base substrate 210 and the orthographic projection of the second conductive trace 222 on the base substrate 210 overlap each other at least partially in the second position P2, and the first conductive trace 221 and the second conductive trace 222 are electrically connected to each other in the second position P2 by an over-hole structure H1 at least penetrating through the insulating layer 233.

It should be noted that the second position P2 may refer to a certain point or may also refer to a certain region. For example, taking the embodiment shown in FIG. 4A as an example, the second position P2 may refer to a center point of the portion between the first conductive trace 221 and the second conductive trace 222 that overlaps each other in the direction R3 perpendicular to the base substrate 210.

For example, in the second position P2, the first conductive trace 221 and the second conductive trace 222 overlap in the direction R3 perpendicular to the base substrate 210, thereby facilitating to providing the over-hole structure H1 at the overlap of the first conductive trace 221 and the second conductive trace 222 to realize the electrical connection between the first conductive trace 221 and the second conductive trace 222. Furthermore, it is possible to increase the effective detection range of the detection trace structure in the opening peripheral region 2031 by means of the first conductive trace 221 and the second conductive trace 222, which are respectively located in different electrode layers, and to optimize the electrical connection between the first conductive trace 221 and the second conductive trace 222 to optimize the layout design of the trace in the opening peripheral region 2031.

In some embodiments of the present disclosure, the second position P2 is spaced from the first position P1 in a circumferential direction along the edge of the second functional region 202. For example, taking the second functional region 202 having a substantially circular outline as shown in FIG. 4A as an example, the circumferential direction may refer to a direction along the circumference of the circle, which may for example be in a clockwise direction or also in a counterclockwise direction. As a result, the short circuit caused by possible material residues that may occur when forming the first conductive trace 221 and the second conductive trace 222 may be reduced or avoided between the portion of the first conductive trace 221 and the second conductive trace 222 that overlap each other in the direction R3 perpendicular to the base substrate 210 and the portion of the first conductive trace 221 or the second conductive trace 222 near the first position P1.

For example, taking the embodiment shown in FIG. 4A as an example, because the first conductive trace 221 and the second conductive trace 222 respectively extend from the first position P1 to the second position P2 along the edge of the second functional region 202 and overlap each other at the second position P2 in the direction R3 perpendicular to the base substrate 210, therefore, by keeping the spacing between the second position P2 and the first position P1, it is possible to reduce or avoid the short circuit, which caused by material residues that may occur when forming the first conductive trace 221 and the second conductive trace 222, between the portion of the first conductive trace 221 and the second conductive trace 222 that overlap each other in the direction R3 perpendicular to the base substrate 210 and the portion of the first conductive trace 221 or the second conductive trace 222 near the first position P1. Therefore, the accuracy and reliability of the signal transmission detection range of the detection trace structure including the first conductive trace 221 and the second conductive trace 222 in the opening peripheral region 2031 are improved, thereby realizing the effective detection of the signal transmission in the opening peripheral region 2031 by the detection trace structure, thereby improving the accuracy and reliability of the detection result obtained by using the detection trace structure.

In some embodiments of the present disclosure, along the circumferential direction of the edge of the second functional region 202, the spacing between the first position P1 and the second position P2 is greater than or equal to ¼ of a circumference of the edge of the second functional region 202, and for example may further be greater than or equal to ½ of the circumference of the edge of the second functional region 202. It should be noted that the above spacing refers to the minimum distance between the first position P1 and the second position P2 along the circumferential direction of the edge of the second functional region 202.

For example, in some embodiments of the present disclosure, as shown in FIG. 4A, the second functional region 202 may be an axisymmetric region, such as an axisymmetric region with a substantially circular contour, with the first position P1 and the second position P2 located on an axisymmetric line of the second functional region 202, whereby in a circumferential direction along the edge of the second functional region 202, the spacing of the first position P1 and the second position P2 is approximately equal to or greater than ½ of the circumference of the edge of the second functional region 202, for example ½ of the circumference of the circle.

Figure 10:
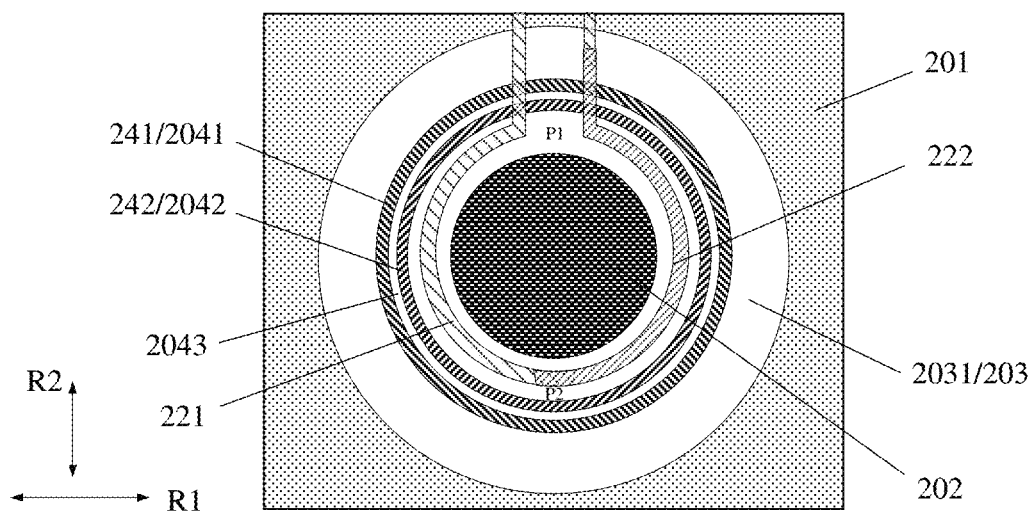
FIG. 10 is a partially enlarged schematic diagram of yet another example of the region AR21 as shown in FIG. 3.

For example, for the second functional region 202 with a substantially circular contour as shown in FIG. 4A, the first position P1 and the second position P2 are located or substantially located on an extension of a diameter of the circle, for example the first position P1 and the second position P2 may be located or substantially located on a straight line passing through the center of the circle and extending in the second direction R2 as shown in FIG. 4A, such that in the circumferential direction along the edge of the second functional region 202 (for example in the circumferential direction of the circle), the first position P1 and the second position P2 may have a relative maximum spacing, for example in the circumferential direction along the edge of the region 202, such that the spacing between the first position P1 and the second position P2 is greater than (for example as shown in FIG. 4A) or equal to (for example as shown in FIG. 10) half of the circumference of the circle. As a result, it is possible to further attenuate or avoid the occurrence of the short circuit between the portion of the first conductive trace 221 and the second conductive trace 222 that overlap each other in the direction R3 perpendicular to the base substrate 210 and the portion of the first conductive trace 221 or the second conductive trace 222 that are close to the first position P1 due to the material residues that may occur when forming the first conductive trace 221 and the second conductive trace 222.

In some embodiments of the present disclosure, as shown in FIG. 4A, the first conductive trace 221 and the second conductive trace 222 are provided symmetrically with respect to the axisymmetric line passing through the first position P1 and the second position P2, thereby facilitating the optimization of the manufacturing process of the first conductive trace 221 and the second conductive trace 222, and further improving the layout design of the first conductive trace 221 and the second conductive trace 222 within the opening peripheral region 2031.

Figure 9A:
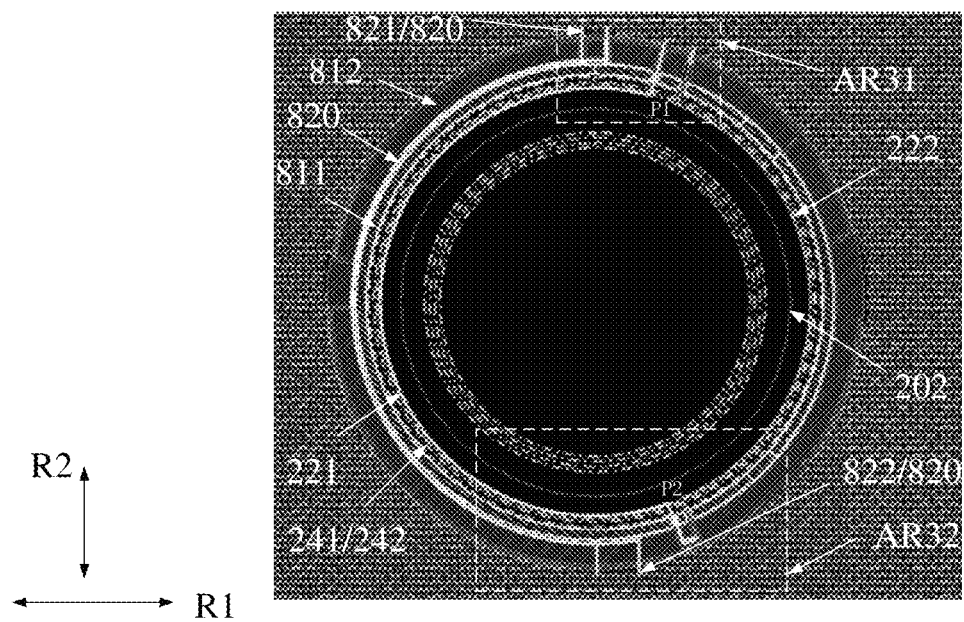
FIG. 9A is a partially enlarged schematic diagram of another example of the region AR21 as shown in FIG. 3.
Figure 9B:
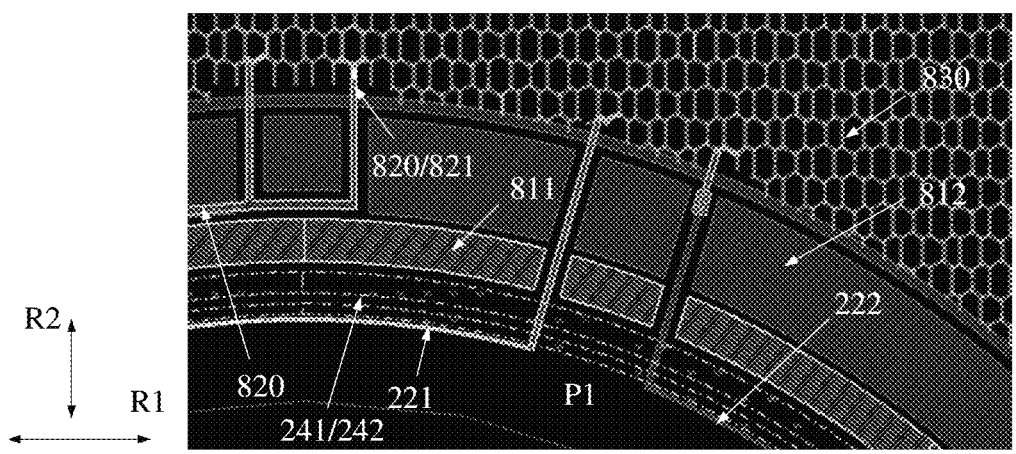
FIG. 9B is a partially enlarged schematic diagram of a region AR31 as shown in FIG. 9A.
Figure 9C:
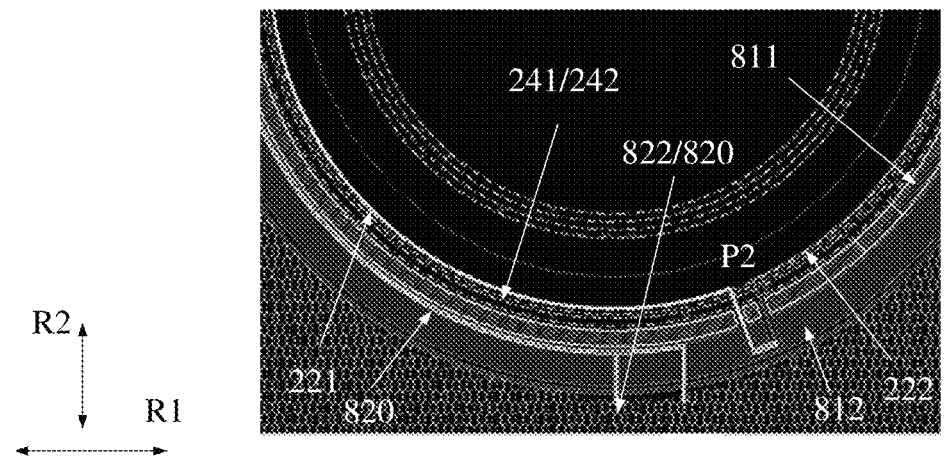
FIG. 9C is a partially enlarged schematic diagram of a region AR32 as shown in FIG. 9A.

In some embodiments of the present disclosure, as shown in FIG. 9A to FIG. 9C, the first position P1 and the second position P2 may also not be located on the axisymmetric line of the second functional region 202, for example the first position P1 may be relatively substantially located in the "1 o'clock direction" of the circle, and the second position P2 may be relatively substantially located in the "5 o'clock direction" of the circle. For example, in the circumferential direction along the edge of the second functional region 202, the minimum distance between the first position P1 and the second position P2 may also be approximately less than ½ of the circumference of the edge of the second functional region 202. For example, in this embodiment, the relative positions of the first position P1 and the second position P2 in the circumferential direction along the edge of the second functional region 202 may be appropriately adjusted according to other traces or structures in the opening peripheral region 2031, so as to reduce or avoid other traces or structures in the opening peripheral region 2031 having an adverse effect on the electrical connection between, for example, the first conductive trace 221 and the second conductive trace 222 at the second position P2. For example, the extension lengths of the first conductive trace 221 and the second conductive trace 222 in the circumferential direction along the edge of the second functional region 202 may be suitably adjusted according to other traces or structures etc. in the opening peripheral region 2031, and the embodiments of the present disclosure are not limited to this case.

It should be noted that FIG. 9A is a partially enlarged schematic diagram of another example of the region AR21 shown in FIG. 3, FIG. 9B is a partially enlarged schematic diagram of a region AR31 shown in FIG. 9A, and FIG. 9C is a partially enlarged schematic diagram of a region AR32 shown in FIG. 9A. For example, except for the relative positions of the first position P1 and the second position P2 in the direction along the edge of the second functional region 202 being different and the length of extension of the first conductive trace 221 and the second conductive trace 222 in the circumferential direction along the edge of the second functional region 202 being different, all other structures in the opening peripheral region 2031 as shown in FIG. 9A to FIG. 9C are substantially the same as or similar to those shown in FIG. 4A, and repeated descriptions are omitted. Further details of the other structures in the opening peripheral region 2031 as shown in FIG. 9A to FIG. 9C may be found in the corresponding descriptions that follow.

Figure 6A:
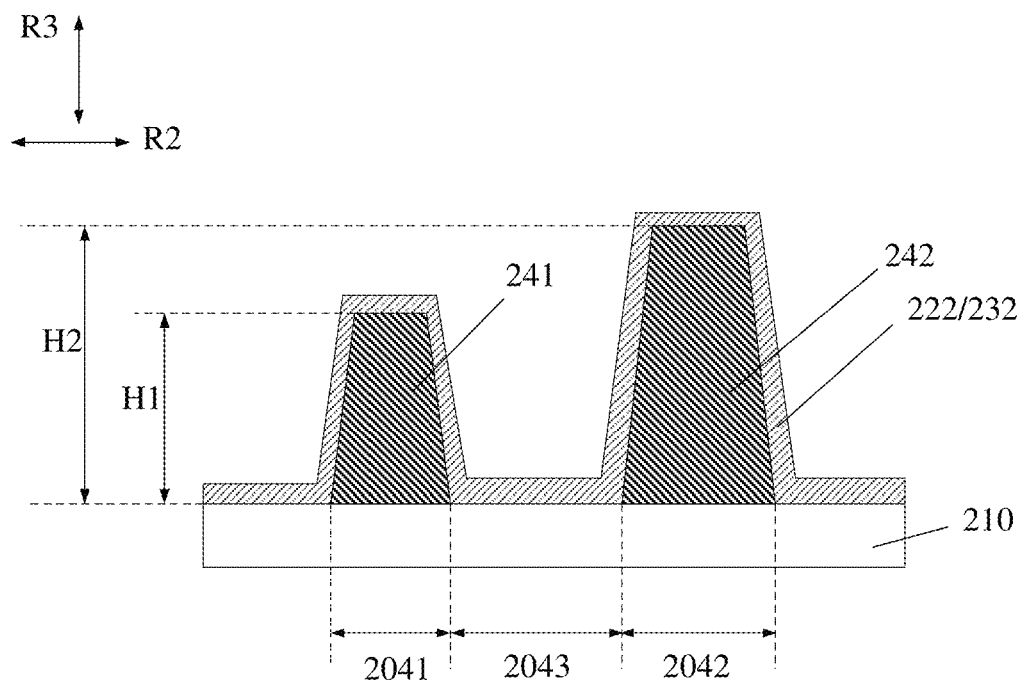
FIG. 6A is a schematic diagram of a partial cross-sectional structure along a line CC' as shown in FIG. 4A.
Figure 6B:
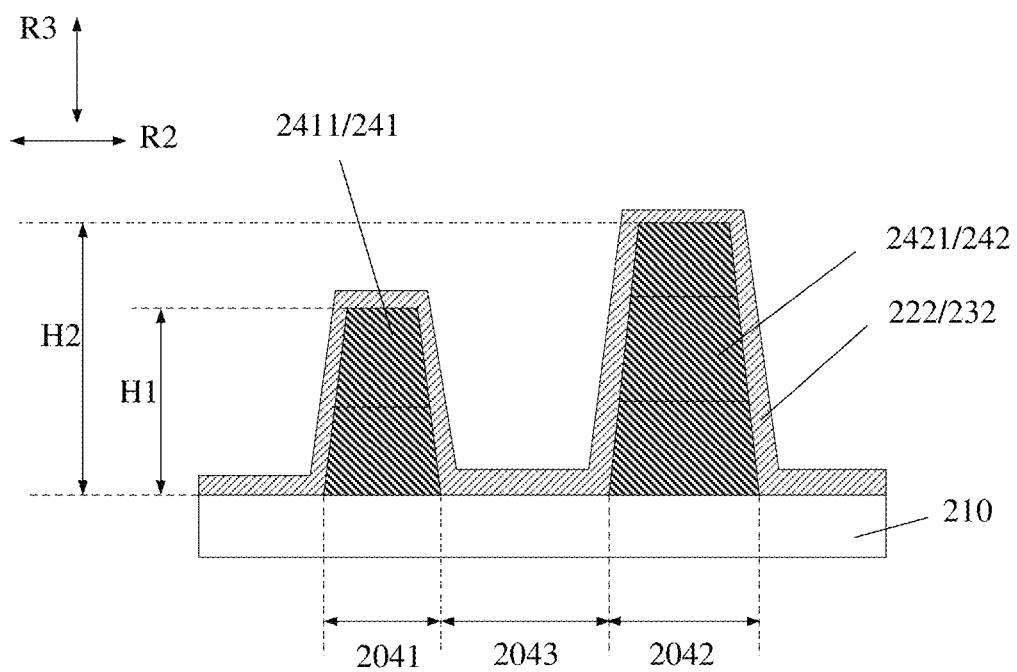
FIG. 6B is a schematic diagram of an example of a plurality of layers of insulating structures included in the first cofferdam structure and the second cofferdam structure as shown in FIG. 6A.
Figure 7:
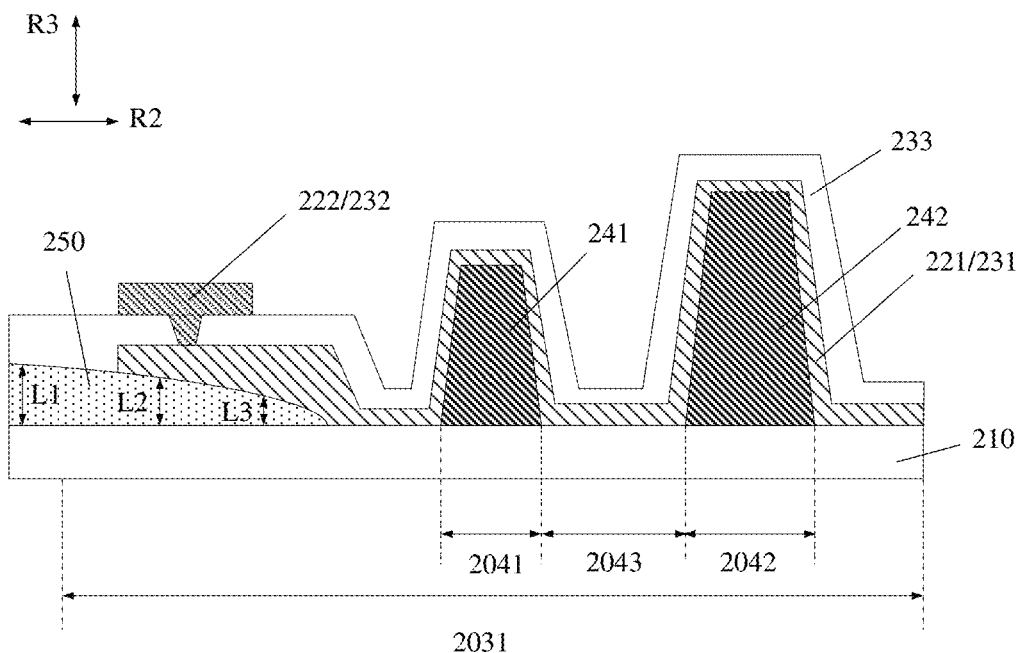
FIG. 7 is a schematic diagram of a partial cross-sectional structure along a line FF' as shown in FIG. 4A.

FIG. 6A is a schematic diagram of a partial cross-sectional structure along a line CC' as shown in FIG. 4A, FIG. 6B is a schematic diagram of an example of a plurality of layers of insulating structures included in the first cofferdam structure and the second cofferdam structure as shown in FIG. 6A, and FIG. 7 is a schematic diagram of a partial cross-sectional structure along a line PP' as shown in FIG. 4A.

In some embodiments of the present disclosure, as shown in FIG. 4A and FIG. 6A, the opening peripheral region 2031 includes a first cofferdam region 2041, a second cofferdam region 2042 and a spacing region 2043, and the electronic substrate 20 includes a first cofferdam structure 241 and a second cofferdam structure 242, the first cofferdam structure 241 is disposed in the first cofferdam region 2041 and the second cofferdam structure 242 is disposed in the in the second cofferdam region 2042. The first cofferdam region 2041 at least partially surrounds the first functional region 201 and may, for example, completely surround the first functional region 201 as shown in FIG. 4A, thereby using the first cofferdam structure 241 to effectively avoid, for example, water vapor or oxygen from penetrating into the interior of, for example, the display member in the first functional region 201. The spacing region 2043 at least partially surrounds the first cofferdam region 2041, for example completely surrounding the first cofferdam region 2041, and the second cofferdam region 2042 at least partially surrounds the spacing region 2043, thereby using the second cofferdam structure 242 to further effectively avoid, for example, water vapor or oxygen etc. from penetrating into, for example, the interior of the display member in the display region 201.

In some embodiments of the present disclosure, the first conductive trace 221 is located at least between the second cofferdam region 2042 and the second functional region 202, for example at least a portion of the first conductive trace 221 is located between the second cofferdam region 2042 and the second functional region 202; the second conductive trace 222 is located at least between the second cofferdam region 2042 and the second functional region 202, for example at least a portion of the second conductive trace 222 is located between the second cofferdam region 2042 and the second functional region 202, whereby the signal transmission in the opening peripheral region 2031 at a location, for example, close to the cutting line used to form the second functional region 202, may be efficiently and accurately detected by the first conductive trace 221 and the second conductive trace 222, thereby improving the accuracy and reliability of the detection results obtained by using the detection trace structure including the first conductive trace 221 and the second conductive trace 222.

For example, as shown in FIG. 6A and FIG. 7, in the direction R3 perpendicular to the base substrate 210, the first conductive trace 221 and the second conductive trace 222 are located on the side of the first cofferdam structure 241 and the second cofferdam structure 242 away from the base substrate 210, thereby avoiding both the possible adverse effects of the first conductive trace 221 and the second conductive trace 222 on the first cofferdam structure 241 and the second cofferdam structure 242 to, for example, block the penetration of water vapor or oxygen into the interior of, for example, the display device in the display region 201, and to effectively and accurately determine whether, for example, the cutting process or other manufacturing process, for example, has an adverse effect on, for example, the circuit connection or signal transmission in the opening peripheral region 2031 by means of the first conductive trace 221 and the second conductive trace 222.

For example, as shown in FIG. 6A, the maximum height H2 of the second cofferdam structure 242 with respect to the base substrate 210 is greater than the maximum height H1 of the first cofferdam structure 241 with respect to the base substrate 210, thereby allowing for more effectively block the penetration of, for example, water vapor or oxygen into, for example, the display region 101 by the first cofferdam structure 241 and the second cofferdam structure 242 after encapsulation, thus further avoiding adverse effects on the each functional layer or structural layer in the electronic substrate 20.

For example, as shown in FIG. 6B, the first cofferdam structure 241 includes at least one layer of insulating structure, for example including a plurality of layers of insulating structure 2411 provided in layers, for example the first cofferdam structure 241 may include two layers of insulating structure 2411 as shown in FIG. 6B, or in some other examples, may also include three, four or more layers of insulating structure; the second cofferdam structure 242 includes at least one layer of insulation structure, for example including a plurality of layers of insulation structure 2421 provided in layers, for example, the second cofferdam structure 242 may include three layers of insulation structure 2421 as shown in FIG. 6B, or in some other examples, may also include two, four, five or more layers of insulation structure. The embodiments of the present disclosure are not specifically limited to the specific number of layers of the insulating structure 2411 included in the first cofferdam structure 241 and the specific number of layers of the insulating structure 2421 included in the second cofferdam structure 242. For example, it is sufficient to satisfy that the maximum height H2 of the second cofferdam structure 242 relative to the base substrate 210 is greater than the maximum height H1 of the first cofferdam structure 241 relative to the base substrate 210.

Therefore, by forming a first cofferdam structure 241 and a second cofferdam structure 242 with a plurality of layers of insulating structure, it is possible to more effectively block the penetration of, for example, water vapor or oxygen into the interior of, for example, the respective functional or structural layers of the display device in the display region 201, and also to avoid undesirable electrical effects on, for example, circuit connection or signal transmission in the electronic substrate 20.

For example, the materials of the plurality of layers of insulating structure 2411 and 2421 may include an inorganic insulating material, such as silicon oxide, silicon nitride, silicon nitride, etc., or may also include an organic insulating material, such as polyimide, polyphthalimide, polyphthalamide, acrylic resin, benzocyclobutene or phenolic resin. Embodiments of the present disclosure are not specifically limited to the materials of the plurality of layers of insulating structure 2411 and 2421. For example, the materials of the plurality of layers of insulating structure 2411 and 2421 may be identical or partially identical to each other, or may not be identical to each other, which is not limited in the embodiment of the present disclosure.

In some embodiments of the present disclosure, the portion of the first conductive trace 221 disposed between the second cofferdam region 2042 and the second functional region 202 and the portion of the second conductive trace 222 disposed between the second cofferdam region 2042 and the second functional region 202 form an arcuate trace structure.

For example, as shown in FIG. 4A, the first conductive trace 221 and the second conductive trace 222 may form an arcuate trace structure including a projection, which is located at least the second position P2, the second position P2 is located between the first cofferdam region 2041 and the first functional region 201, for example, the projection includes a portion of the first conductive trace 221 and the second conductive trace 222 overlapping each other in the direction R3 perpendicular to the base substrate 210 and used to achieve an electrical connection.

Therefore, by causing the overlap portion between the first conductive trace 221 and the second conductive trace 222 in the direction R3 perpendicular to the base substrate 210 to be located on the side of the first cofferdam region 2041 close to the first functional region 201, i.e. on the side of the first cofferdam region 2041 away from the spacing region 2043 and the second cofferdam region 2042, the overlap portion may be kept away from the "trench" formed by the first cofferdam structure 241 and the second cofferdam structure 242, so that the overlap portion between the first conductive trace 221 and the second conductive trace 222 may be relatively flat, which is beneficial to the formation of, for example, an over-hole structure H1 or other means of electrically connecting the first conductive trace 221 to the second conductive trace 222 on the overlap portion.

For example, as shown in FIG. 7, in order to reduce or avoid possible adverse effects on devices or structures, etc., located in the first functional region 201, for example, a thin film encapsulation layer 250 covering the surface of the first functional region 201 is typically prepared to extend into the opening peripheral region 2031. For example, a height L1 of the portion of the thin film encapsulation layer 250 located in the first functional region 201 relative to the base substrate 210 is basically maintained at about 7 μm to 8 μm, while the height of the portion of the thin film encapsulation layer 250 in the opening peripheral region 2031 relative to the base substrate 210 decreases with the distance of the thin film encapsulation layer 250 away from the first functional region 201. For example, as shown in FIG. 7, the height L2 of the portion of the thin film encapsulation layer 250 in the opening peripheral region 2031 and closer to the first cofferdam region 2041 is about 3 μm to 5 μm relative to the base substrate 210, and the height L3 of the portion of the thin film encapsulation layer 250 in the opening peripheral region 2031 and relatively closer to the first cofferdam region 2041 is about 0.1 μm to 1 μm relative to the base substrate 210, which in turn tends to result in a larger film break at the location near the first cofferdam structure 241 in the opening peripheral region 2031. In the embodiment of the present disclosure, by disposing the second position P2 away from the "trench" formed by the first cofferdam structure 241 and the second cofferdam structure 242, i.e. by disposing the over-hole structure for the electrical connection between the first conductive trace 221 and the second conductive trace 222 away from the "trench" formed by the first cofferdam structure 241 and the second cofferdam structure 242, so that the overlap portion between the first conductive trace 221 and the second conductive trace 222 may be relatively flat, thereby improving the stability and reliability of the electrical connection between the first conductive trace 221 and the second conductive trace 222.

In addition, in the case where the overlap portion between the first conductive trace 221 and the second conductive trace 222 is located on the side of the first cofferdam region 2041 near the first functional region 201, the size or area of the overlap portion between the first conductive trace 221 and the second conductive trace 222 in a plane parallel to the main surface of the base substrate 210 may also be suitably increased, thereby further facilitating the effect of the electrical connection between the first conductive trace 221 and the second conductive trace 222.

For example, as shown in FIG. 10, the second position P2 may also be located between the second cofferdam region 2042 and the second functional region 202, for example the overlap portion between the first conductive trace 221 and the second conductive trace 222 in the direction R3 perpendicular to the base substrate 210 may be located between the second cofferdam region 2042 and the second functional region 202, and the first conductive trace 221 and the second conductive trace 222 form an arcuate trace structure that is approximately circular. As a result, the first conductive trace 221 and the second conductive trace 222 may be positioned closer to the cutting line used to form the second functional region 202, thereby improving the accuracy and reliability of the detection result obtained by the first conductive trace 221 and the second conductive trace 222, and the layout of the first conductive trace 221 and the second conductive trace 222 in the opening peripheral region 2031 may also be reduced, thereby optimizing the layout design in the opening peripheral region 2031. In addition, the overlap portion between the first conductive trace 221 and the second conductive trace 222 in the direction R3 perpendicular to the base substrate 210 may also be further extended from the second cofferdam region 2042 to the side of the first cofferdam region 2041 away from the second cofferdam region 2042 to appropriately increase the size or area of the overlap portion between the first conductive trace 221 and the second conductive trace 222 in a plane parallel to the main surface of the base substrate 210, so as to further facilitate the effect of the electrical connection between the first conductive trace 221 and the second conductive trace 222.

It should be noted that the above embodiment of the present disclosure is not specifically limited as to how the first conductive trace 221 and the second conductive trace 222 are electrically connected to each other at the second position P2. For example, for the portion of the first conductive trace 221 and the second conductive trace 222 overlapping each other in the direction R3 perpendicular to the base substrate 210, the over-hole structure H1 as shown in FIG. 5A may be provided to achieve the electrical connection between the first conductive trace 221 and the second conductive trace 222, thereby simplifying the manufacturing process and reducing the manufacturing cost; alternatively, a plurality of over-hole structure H1 as shown in FIG. 5A may also be provided in the overlap portion between the first conductive trace 221 and the second conductive trace 222, thus improving the stability and reliability of the electrical connection between the first conductive trace 221 and the second conductive trace 222, for example, the plurality of over-hole structure H1 may be arranged in one or more rows, or may be arranged in other suitable ways.

It should be noted that in some embodiments of the present disclosure, the first conductive trace 221 may also be formed in a plurality of electrode layers. For example, in the case where the first conductive trace 221 is formed in both the first electrode layer 231 and the second electrode layer 232, for example, the first conductive trace 221 may be provided as a double-layer trace structure extending around the edge of the second functional region 202, and the two layer trace structures of the first conductive trace 221 respectively located in the first electrode layer 231 and the second electrode layer 232 may be connected to each other, for example, through an over-hole structure at least penetrating through the insulating layer 233; for example, the portion of the first conductive trace 221 near the first position P1 may have a single-layer trace structure, and the portion of the first conductive trace 221 away from the first position P1 may have a double-layer trace structure, so that the first conductive trace 221 and the second conductive trace 222 may be electrically connected by direct contact at the second position P2. For example, the second conductive trace 222 may also be formed in a plurality of electrode layers. For example, if the second conductive trace 222 is formed in both the first electrode layer 231 and the second electrode layer 232, for example, the second conductive trace 222 may be provided as a double-layer trace structure extending around the edge of the second functional region 202, and the double-layer trace structure of the second conductive trace 222 respectively located in the first electrode layer 231 and the second electrode layer 232 may be electrically connected through a over-hole structure penetrating through the insulating layer; for example, the portion of the second conductive trace 222 near the first position P1 may be provided with a single-layer trace structure, and the portion of the second conductive trace 222 away from the first position P1 may be provided with a double-layer trace structure, so that the first conductive trace 221 and the second conductive trace 222 may be electrically connected by direct contact at the second position P2.

It should be noted that in the above embodiments of the present disclosure, other structures or devices, etc., that may be provided in the opening peripheral region 2031, are omitted in FIG. 4A, FIG. 4B and FIG. 10 in order to clearly illustrate how the first conductive trace 221 and the second conductive trace 222 are provided in the opening peripheral region 2031, but this case does not constitute a limitation of the opening peripheral region 2031 in the embodiments of the present disclosure. An example of the opening peripheral region 2031 is illustrated below by using the specific example as shown in FIG. 9A to FIG. 9C, but it should be noted that the present disclosure includes, but is not limited to, this case.

It should be noted that, except for the relative positions of the first position P1 and the second position P2 in the direction along the edge of the second functional region 202 being different and the extension lengths of the first conductive trace 221 and the second conductive trace 222 in the circumferential direction along the edge of the second functional region 202 being different, the other structures in the opening peripheral region 2031 as shown in FIG. 9A to FIG. 9C are substantially the same or similar to those shown in FIG. 4A, and repeated details will not be repeated.

In some embodiments of the present disclosure, on the basis of the electronic substrate 20 as shown in FIG. 3 to FIG. 7 above, and as shown in FIG. 9A to FIG. 9C, the electronic substrate 20 further includes at least one first dummy electrode pattern 811 disposed in the opening peripheral region 2031, and the at least one first dummy electrode pattern 811 may include, for example, a plurality of first dummy electrode patterns 811 as shown in FIG. 9A, and the plurality of first dummy electrode patterns 811 are spaced apart and insulated from each other; the electronic substrate 20 further includes at least one second dummy electrode pattern 812 disposed in the opening peripheral region 2031, the at least one second dummy electrode pattern 812 may for example include a plurality of second dummy electrode patterns 812 as shown in FIG. 9A, and the plurality of second dummy electrode patterns 812 being spaced apart and insulated from each other.

The first dummy electrode pattern 811 and the second dummy electrode pattern 812 are located between the first functional region 201 and the first cofferdam region 2041; the first dummy electrode pattern 811 is located in the first electrode layer 231 and is spaced apart and insulated from the first conductive trace 221 and the second conductive trace 222, respectively; the second dummy electrode pattern 812 is located in the second electrode layer 232 and is spaced apart and insulated from the first conductive trace 221 and the second conductive trace 222 respectively. As a result, mutual interference between the elements or structures etc. located in the first functional region 201 and the elements or structures etc. located in the opening peripheral region 2031 and the second functional region 202 may be reduced or avoided by the first dummy electrode pattern 811 and the second dummy electrode pattern 812, thereby enhancing the stability and reliability of the electronic substrate 20.

It should be noted that in some other embodiments of the present disclosure, it may also be the case that the first dummy electrode pattern 811 is located in the second electrode layer 232 and the second dummy electrode pattern 812 is located in the first electrode layer 231; or, it may be the case that both the first dummy electrode pattern 811 and the second dummy electrode pattern 812 are located in the same first electrode layer 231 or the same second electrode layer 232; alternatively, the first dummy electrode pattern 811 or the second dummy electrode pattern 812 may also have a double-layer electrode structure, which may for example include a part in the first electrode layer 231 and a part in the second electrode layer 232, and the two parts are electrically connected to each other for example by an over-hole structure at least penetrating through the insulating layer 233, and the embodiments of the present disclosure are not limited to this case.

For example, the first dummy electrode pattern 811 and the second dummy electrode pattern 812 may be spaced apart and insulated from each other, or the adjacent first dummy electrode pattern 811 and the second dummy electrode pattern 812 may be electrically connected to each other. For example, the first dummy electrode pattern 811 and the second dummy electrode pattern 812 may be in a floating or suspended state, or it may also be subjected to the same or different electrical signals, and the embodiments of the present disclosure are not limited to this case.

For example, as shown in FIG. 9A to FIG. 9C, there is a spacing between adjacent first dummy electrode patterns 811 in a plurality of first dummy electrode patterns 811, an orthographic projection of the plurality of first dummy electrode patterns 811 on the base substrate 210 partially surrounds the first functional region 201. Alternatively, in some other embodiments of the present disclosure, only one first dummy electrode pattern 811 may be provided in the opening peripheral region 2031 and the orthographic projection of that first dummy electrode pattern 811 on the base substrate 210 may completely surround the first functional region 201, and the embodiments of the present disclosure are not limited to this case.

For example, as shown in FIG. 9A to FIG. 9C, there is a spacing between adjacent second dummy electrode patterns 812 in a plurality of second dummy electrode patterns 812, the orthographic projection of the plurality of second dummy electrode patterns 812 on the base substrate 210 partially surrounding the first functional region 201. Alternatively, in some other embodiments of the present disclosure, it is also possible to provide only one second In some other embodiments of the present disclosure, only one second dummy electrode pattern 812 may be provided in the opening peripheral region 2031 and the orthographic projection of this second dummy electrode pattern 812 on the base substrate 210 may completely surround the first functional region 201, and the embodiments of the present disclosure are not limited to this case.

For example, as shown in FIG. 9A to FIG. 9C, the orthographic projection of the first dummy electrode pattern 811 on the base substrate 210 is located on a side of the orthographic projection of the second dummy electrode pattern 812 on the base substrate 210 away from the first functional region 201, for example the first dummy electrode pattern 811 is located in sn "inner circle" closer to the second functional region 202, and the second dummy electrode pattern 812 is located closer to an "outer ring" of the first functional region 201. Alternatively, in some other embodiments of the present disclosure, it may be that the orthographic projection of the first dummy electrode pattern 811 on the base substrate 210 is located on the side of the orthographic projection of the second dummy electrode pattern 812 on the base substrate 210 closer to the first functional region 201, for example the second dummy electrode pattern 812 is located closer to the "inner circle" of the second functional region 202 and the first dummy electrode pattern 811 is located closer to the "outer ring" of the first functional region 201, and the embodiments of the present disclosure are not limited to this case. Alternatively, in some other embodiments of the present disclosure, it may be that the first dummy electrode pattern 811 and the second dummy electrode pattern 812 are both disposed side by side along the same circle between the first functional region 201 and the second functional region 202.

In some embodiments of the present disclosure, as shown in FIG. 9A to FIG. 9C, the electronic substrate 20 further includes a connection trace pattern 820. For example, the connection trace pattern 820 is at least located in the opening peripheral region 2031 and partially surrounds the first functional region 201, for example the connection trace pattern 820 may be located in both the opening peripheral region 2031 and the first functional region 201, and a first end 821 and a second end 821 of the connection trace pattern 820 extend into the first functional region 201, respectively, so that the corresponding structures or devices (for example elements with display or touch functions) in the first functional region 201 located on opposite sides of the second functional region 202 may be electrically connected to each other by the connection trace pattern 820, thereby facilitating the stability and reliability of the signal transmission in the electronic substrate 20.

For example, referring to FIG. 9B, where the electronic substrate 20 includes a touch substrate, the connection trace pattern 820 may be used to achieve an electrical connection between, for example, a touch electrode structure 830 located in the first functional region 201 and on the upper and lower sides of the second functional region 202, such that the connection trace pattern 820 may be used to transmit, for example, a touch signal in the opening peripheral region 2031 for the first functional region 201 to enable the electronic substrate 20 to achieve touch functionality. For example, the touch electrode structure 830 may include a plurality of grids as shown in FIG. 9B to form a grid-shape electrode structure.

For example, in the opening peripheral region 2031, an orthographic projection of the connection trace pattern 820 on the base substrate 210 is located between an orthographic projection of the one or more first dummy electrode patterns 811 on the base substrate 210 and an orthographic projection of the one or more second dummy electrode patterns 812 on the base substrate 210, i.e., in a plane parallel to the base substrate 210, the connection trace pattern 820 is located on a side of the first dummy electrode pattern 811 away from the second functional region 202 and on a side of the second dummy electrode pattern 812 away from the first functional region 201. The connection trace pattern 820 and the first dummy electrode pattern 811 are spaced apart and insulated from each other, and the connection trace pattern 820 and the second dummy electrode pattern 812 are spaced apart and insulated from each other. Thus, possible interference between the signals transmitted on the connection trace pattern 820 and other structures or elements in the first functional region 201 or the opening peripheral region 2031 may be attenuated or avoided by the first dummy electrode pattern 811 as well as the second dummy electrode pattern 812.

In some embodiments of the present disclosure, for example as shown in FIG. 9A to FIG. 9C, the connection trace pattern 820 is disposed in the first electrode layer 231. Alternatively, in some other embodiments of the present disclosure, the connection trace pattern 820 may also be located in the second electrode layer 232; alternatively, the connection trace pattern 820 may also be located in both the first electrode layer 231 and the second electrode layer 232, for example, it may be alternately formed in the first electrode layer 231 and the second electrode layer 232 along the edge of the second functional region 202, and the embodiments of the present disclosure are not limited to this case.

For example, as shown in FIG. 9A to FIG. 9C, the first end 821 of the connection trace pattern 820 is spaced between the first position P1 and the second position P2, respectively, and the second end 822 of the connection trace pattern 820 is spaced between the first position P1 and the second position P2, respectively, in a circumferential direction along the edge of the second functional region 202. That is, in the case where the first conductive trace 221 and the second conductive trace 222 are provided along the edge of the second functional region 202, it is possible to keep both ends of the first conductive trace 221 spaced from the first end 821 and the second end 822 of the connection trace pattern 820, respectively, and to keep both ends of the second conductive trace 222 spaced from the first end 821 and the second end 822 of the connection trace pattern 820, respectively. As a result, possible adverse effects between the signals transmitted on the connection trace pattern 820 and the signals on the first conductive trace 221 and the second conductive trace 222 may be reduced or avoided, further enhancing the stability of the electronic substrate 20.

For example, as shown in conjunction with FIG. 4A, FIG. 4B and FIG. 5A, the detection trace structure further includes a third conductive trace 223 and a fourth conductive trace 224 located in the opening peripheral region 2031. The third conductive trace 223 is located in the first electrode layer 231 and is connected to the first conductive trace 221 at an end of the first conductive trace 221 near the first position P1, for example the third conductive trace 223 may be provided integrally with the first conductive trace 221. The fourth conductive trace 224 is located in the second electrode layer 232 and is connected to the second conductive trace 222 at an end of the second conductive trace 222 near the first position P1, for example the fourth conductive trace 224 may be integrally provided with the second conductive trace 222. The third conductive trace 223 and the fourth conductive trace 224 each extend in a substantially straight line from the first position P1 in a direction away from the center of the second functional region 202. For example, the third conductive trace 223 and the fourth conductive trace 224 extend from the side of the second cofferdam structure 242 near the second functional region 202 to the side of the first cofferdam structure 241 near the first functional region 201, i.e., in a plane parallel to the base substrate 210, the third conductive trace 223 and the fourth conductive trace 224 cross the "trench" formed by the first cofferdam structure 241 and the second cofferdam structure 242. Therefore, by providing the third and fourth conductive traces 223 and 224, the connection between the first and second conductive traces 221 and 222 and the other traces in the detection line structure may be facilitated, thus simplifying the process of preparing the detection line structure and reducing the manufacturing costs.

For example, the detection trace structure further includes a first trace portion 2201 and a second trace portion 2202. The first trace portion 2201 includes a first connection end and a second connection end, the first connection end of the first trace portion 2201 serves as the first or second end of the detection trace structure, the second connection end of the first trace portion 2201 is configured to be connected to a third conductive trace 223. The second trace portion 2202 includes a first connection end and a second connection end, the first connection end of the second trace portion 2202 serves as the second end or the first end of the detection trace structure, the second connection end of the second trace portion 2202 is configured to be connected to the fourth conductive trace 224. The first trace portion 2201, the third conductive trace 223, the first conductive trace 221, the second conductive trace 222, the fourth conductive trace 224 and the second trace portion 2202 are connected to each other in sequence between the detection signal source 410 and the detection circuit 420. Thus, by determining the signal transmission effect of the detection trace structure between the detection signal source 410 and the detection circuit 420, the circuit connection of the detection trace structure in the peripheral region 203 (for example the opening peripheral region 2031) may be accurately and efficiently determined, and then based on the detection results of the detection trace structure, it is possible to determine or further detect whether other circuit connections or signal transmissions in the electronic substrate 20 are not adversely affected by, for example, a disconnection or a poor contact of the circuit during the manufacturing process according to the detection result of the detection trace structure.

It should be noted that in some embodiments of the present disclosure, as shown in FIG. 4B, it may be that the first trace portion 2201 is connected to the detection circuit 420 and the second trace portion 2202 is connected to the detection signal source 410, for example, they are connected in the order of the detection circuit 420, the first trace portion 2201, the third conductive trace 223, the first conductive trace 221, the second conductive trace 222, the fourth conductive trace 224, the second trace portion 2202 and the detection signal source 410; or, in some other embodiments of the present disclosure, it may be that the second trace portion 2202 is connected to the detection circuit 420, and the first trace portion 2201 is connected to the detection signal source 410, for example, they are connected in the order of the detection signal source 410, the first trace portion 2201, the third conductive trace 223, the first conductive trace 221, the second conductive trace 222, the fourth conductive trace 224, the second trace portion 2202 and the detection circuit 420, which is not specifically limited by embodiments of the present disclosure.

For example, the first trace portion 2201 includes a fifth conductive trace 225 at least partially disposed in the first functional region 201, for example the fifth conductive trace 225 may be disposed in the first functional region 201 and the opening peripheral region 2031 to achieve an electrical connection with the third conductive trace 223. The second trace portion 2202 includes a sixth conductive trace 226 at least partially disposed in the first functional region 201, for example the sixth conductive trace 226 may be disposed in the first functional region 201 and the opening peripheral region 2031 to achieve an electrical connection with the fourth conductive trace 224.

Figure 5B:
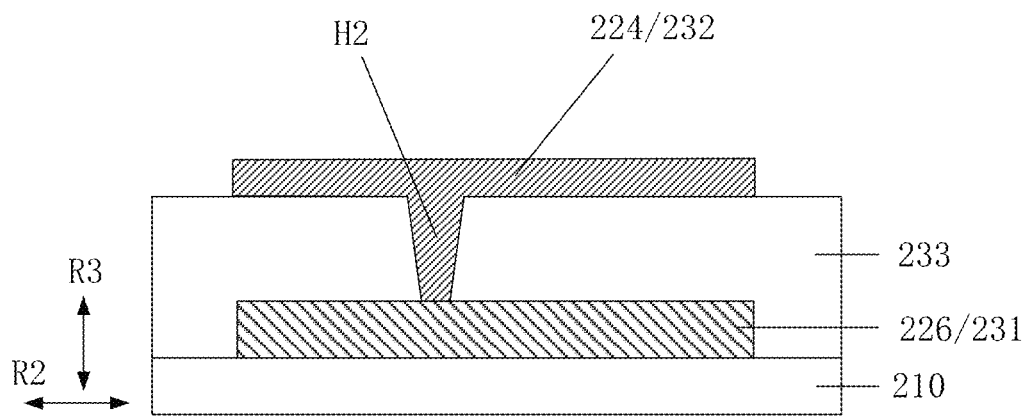
FIG. 5B is a schematic diagram of a partial cross-sectional structure along a line DD' as shown in FIG. 4A.

FIG. 5B is a schematic diagram of a partial cross-sectional structure along a line DD' as shown in FIG. 4A. As shown in FIG. 4A to FIG. 5B, the fifth conductive trace 225 and the sixth conductive trace 226 are located in the first electrode layer 231, the fifth conductive trace 225 is connected to the third conductive trace 223 and is provided integrally, and the sixth conductive trace 226 and the fourth conductive trace 224 are electrically connected to each other by means of an over-hole structure H2 at least penetrating through the insulating layer 233. Thus, by ensuring the connection between the first conductive trace 221 and the second conductive trace 222 and the other traces in the detection trace structure, the preparation of the detection trace structure in the electronic substrate 20 may be further simplified by causing the fifth conductive trace 225 in the first trace portion 2201 and the sixth conductive trace 226 in the second trace portion 2202 to be both located in the same electrode layer, thus reducing the manufacturing cost.

For example, as shown in FIG. 4A to FIG. 5B, the over-hole structure H2 may be provided on a side of the first cofferdam structure 241 and the second cofferdam structure 242 away from the second functional region 202, and the end of the sixth conductive trace 226 connected to the fourth conductive trace 224 does not extend into the first cofferdam region 2041. For example, the spacing between the over-hole structure H2 and the first cofferdam structure 241 may be set relatively large, for example, to cause the over-hole structure H2 to be closer to the display region 201, so that the over-hole structure H2 and the sixth conductive trace 226 are relatively far away from the "trench" region formed by the first cofferdam structure 241 and the second cofferdam structure 242, thereby reducing or avoiding possible short circuits between the fifth conductive trace 225 and the sixth conductive trace 226 located in the same first electrode layer 231, for example due to material residues.

It should be noted that in some embodiments of the present disclosure, as shown in FIG. 4B, it may be that both the fifth conductive trace 225 and the sixth conductive trace 226 are located in the first electrode layer 231; or, in some other embodiments of the present disclosure, it may be that both the fifth conductive trace 225 and the sixth conductive trace 226 are located in the second electrode layer 232, which is not limited in the embodiment of the present disclosure. Alternatively, in some other embodiments of the present disclosure, the fifth conductive trace 225 and the sixth conductive trace 226 may be located in separate electrode layers according to practical needs.

In some embodiments of the present disclosure, the detection signal source 410 and the detection circuit 420 may be provided separately. For example, the detection signal source 410 and the detection circuit 420 may be provided in the peripheral region 203 of the electronic substrate 20, for example, within the outer frame region of the electronic substrate 20, to facilitate to be connected to the detection trace structure.

Figure 11:
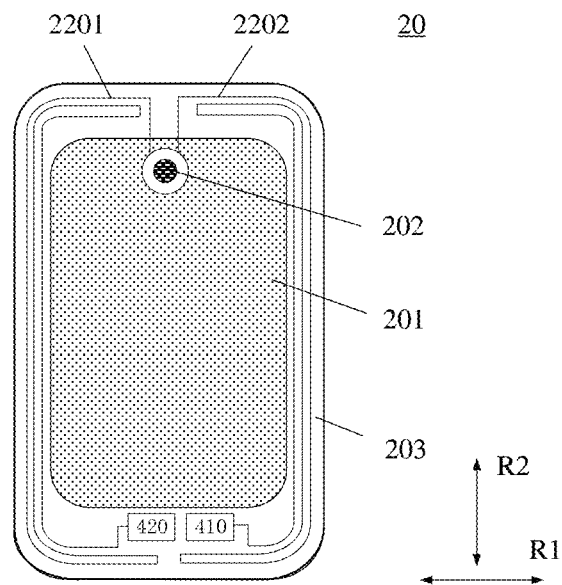
FIG. 11 is a schematic diagram of a connection between a detection trace structure, a detection signal source, and a detection circuit which are in an electronic substrate provided by some embodiments of the present disclosure.

FIG. 11 is a schematic diagram of a connection between a detection trace structure, a detection signal source, and a detection circuit in an electronic substrate provided by some embodiments of the present disclosure.

For example, for the case where the detection signal source 410 and the detection circuit 420 are provided separately, as shown in FIG. 11, the detection signal source 410 and the detection circuit 420 may be provided within the peripheral region 203 of the electronic substrate 20, thereby avoiding the occupation of layout space in the functional regions (for example the first functional region 201 and the second functional region 202) of the electronic substrate 20 and reducing the impact influence on the elements or structures etc. provided set in the functional region.

For example, the detection trace structure may be provided within the peripheral region 203 along the outer edge of the peripheral region 203. For example, as shown in FIG. 11, the first trace portion 2201 and the second trace portion 2202 of the detection trace structure are respectively provided along the outer edge of the electronic substrate 20 and are respectively connected to the detection circuit 420 and the detection signal source 410 located in the peripheral region 203. For example, the first trace portion 2201 and the second trace portion 2202 may include multiple loops of trace along the outer edge of the electronic substrate 20 as shown in FIG. 11; or, in some other examples, the first trace portion 2201 and the second trace portion 2202 may also be provided with only one loop of trace along the outer edge of the electronic substrate 20. For example, the multiple loops shown in FIG. 11 may be located in the same electrode layer or in separate electrode layers, respectively, thereby enabling the detection of signal transmission in the different electrode layers in the peripheral region 203 via the multiple loops. For example, the multiple loops of trace located in the different electrode layers may be connected to each other by an over-hole structure, for example at least penetrating through the insulating layer.

In some embodiments of the present disclosure, for example, the detection circuit 420 may be connected to, for example, an element with a display function in the electronic substrate 20. In the case where the signal provided by the detection signal source 410 may be normally transmitted to the detection circuit 420 through the detection trace structure, the display device may be in a cut-off state under the control of the detection circuit 420 and no light is emitted; in the case where the signal provided by the detection signal source 410 may not be normally transmitted to the detection circuit 420 through the detection trace structure, the display device is in a suspended state or may also be in a conduction state under the control of the detection circuit 420 and light is emitted, so that the signal transmission on the detection trace structure may be judged by the light-emitting state of the display device.

It should be noted that in some other embodiments of the present disclosure, according to different actual requirements, for example according to the layout design requirements within the peripheral region of the electronic substrate, the detection signal source and the detection circuit may also be provided in, for example, the first functional region, which is not limited by the embodiment of the present disclosure.

In some embodiments of the present disclosure, it is also possible to multiplex one or more functional elements or structures in the electronic substrate 20, for example, for use as a detection signal source 410 or detection circuit 420.

Figure 12:
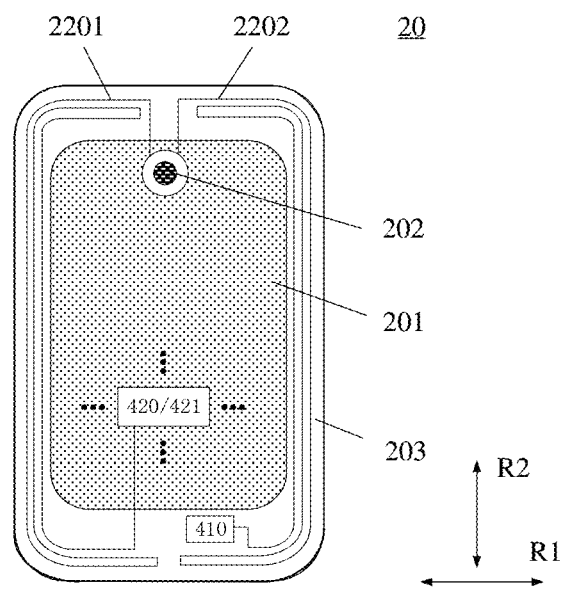
FIG. 12 is a schematic diagram of another connection mode between a detection trace structure, a detection signal source and a detection circuit which are in an electronic substrate provided by some embodiments of the present disclosure.

For example, in some embodiments of the present disclosure, as shown in FIG. 12, the electronic substrate 20 includes a display substrate with the first functional region 201 is configured as a display region. For example, the display substrate includes a plurality of pixel units 421 arranged in an array, each pixel unit 421 includes a driving circuit and a light-emitting element, the driving circuit includes a first transistor. The first transistor is configured for use as a detection circuit 420, and a second end of the detection trace structure is configured to be electrically connected to a gate electrode of the first transistor.

For example, the first transistor may be a driving transistor in the pixel unit 421 for driving the light-emitting element and controlling the amount of driving current flowing through the light-emitting element, or it may be a light-emitting control transistor for controlling whether the driving current flows through the light-emitting element, or it may be a data writing transistor for controlling the writing of data signals. Thus, the light-emitting element may emit light or emit light of different brightness under the control of the first transistor, and in the case where the first transistor is used as detection circuit 420, the electrical signal transmitted by the detection trace structure is applied to a gate electrode of the first transistor to control the working state of the first transistor (for example to control the turn-on state of the first transistor). Thereby, by the light-emitting state of the light-emitting element electrically connected to the first transistor, the detection of the signal transmission effect of the detection trace structure is realized.

For example, by using the first transistor as the detection circuit 420, the detection of the effect of signal transmission on the detection trace structure may be carried out during the non-light-emitting stage of the display substrate. For example, before the display substrate is shipped from the factory or before the display substrate is used for screen display, the first transistor is used as the detection circuit 420 to detect the signal transmission on the detection trace structure, so that it may be further determined whether, for example, the circuit connection or signal transmission in the display substrate is in a normal working state, thereby improving the stability and reliability of the display substrate.

The embodiments of the present disclosure do not specifically limit the type of the first transistor, for example, the first transistor may be an N-type transistor or a P-type transistor. For example, in the case where the detection signal source 410 is a signal source providing a low-level signal, for example, in the case where the first transistor is an N-type driving transistor driving a light-emitting element to emit light (for example the light-emitting element emits light in the turn-on state of the first transistor), in the case where the first transistor is used as the detection circuit 420, if the light-emitting element does not emit light, the first transistor is in a turn-off state and the low-level signal provided by the detection signal source 410 is applied to the gate electrode of the first transistor, and there is no defective phenomenon, such as a disconnection of the circuit in the detection trace structure; if the light-emitting element emits light, the first transistor is in the turn-on state, the low level signal provided by the detection signal source 410 is not applied to the gate electrode of the first transistor, and there may be a defective phenomenon, such as a disconnection or a poor contact of the circuit in the detection trace structure. For example, in the case where the detection signal source 410 is a signal source providing a high-level signal, and the first transistor is a P-type driving transistor driving a light-emitting element (for example the light-emitting element emits light in the turn-on state of the first transistor), in the case where the first transistor is used as the detection circuit 420, if the light-emitting element does not emit light, the first transistor is in a turn-off state and the high-level signal provided by the detection signal source 410 is applied to the gate electrode of the first transistor, and there is no defective phenomenon, such as a disconnection of the circuit in the detection trace structure; if the light-emitting element emits light, the first transistor is in the turn-on state, the high-level signal provided by the detection signal source 410 is not applied to the gate electrode of the first transistor, and there may be a defective phenomenon, such as a disconnection or a poor contact of the circuit in the detection trace structure.

The embodiments of the present disclosure are not specifically limited to the type, material, structure, etc. of the first transistor, which may be, for example, a top-gate type, a bottom-gate type, etc. For example, an active layer of the first transistor may be amorphous silicon, polycrystalline silicon (for example low temperature polycrystalline silicon, high temperature polycrystalline silicon), oxide semiconductor (for example indium gallium tin oxide), etc. For example, the first transistor may be a thin-film transistor, a field-effect transistor or other switching element with the same characteristics.

It should be noted that the embodiments of the present disclosure are not limited to the type and specific composition of the driving circuit, for example, the driving circuit may be a current-driven or voltage-driven type, a 2T1C (i.e., two transistors and a capacitor, the two transistors includes a driving transistor and a data writing transistor) driving circuit, and further includes a compensation circuit (a compensation transistor), a light-emitting control circuit (a light-emitting control transistor), a reset circuit (a reset transistor), etc.

Figure 13:
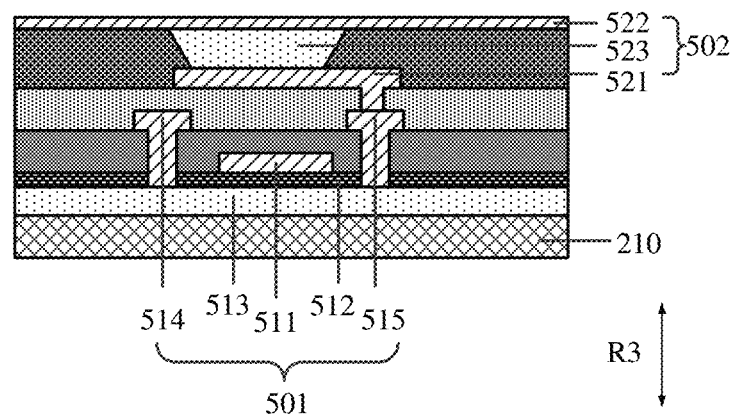
FIG. 13 is a schematic diagram of an example of a partial cross-sectional structure of a first functional region of an electronic substrate provided by some embodiments of the present disclosure.

FIG. 13 is a schematic diagram of an example of a partial cross-sectional structure of a first functional region of an electronic substrate provided by some embodiments of the present disclosure, for example the first functional region 201 may be configured as a display region. It should be noted that the specific structure of the first transistor and the light-emitting element shown in FIG. 13 are only illustrative, and that embodiments of the present disclosure include, but are not limited to, this case.

It should be noted that, for the sake of clarity and brevity, only the first transistor 501 located on the base substrate 210 and the light-emitting element 502 electrically connected to the first transistor 501 are shown in FIG. 13. For example, the first transistor 501 may be a driving transistor configured to operate in a saturated state and control the amount of current that drives the light-emitting element 502 to emit light. Alternatively, the first transistor 501 may be a light-emitting control transistor for controlling whether or not the current flow to drive the light-emitting element 502. Alternatively, the first transistor 501 may also be a data writing transistor for controlling the writing of data signals. Embodiments of the present disclosure are not limited to the specific type of first transistor 501.

As shown in FIG. 13, the first transistor 501 includes a gate electrode 511, a gate insulating layer 512, an active layer 513, a first electrode 514 and a second electrode 515 which is electrically connected to the first light-emitting electrode 521 of the light-emitting element 502.

For example, the gate electrode 511 of the first transistor 501 may be located in the same electrode layer as the first conductive trace or the second conductive trace in the detection trace structure, for example, the gate electrode 511 may be located in the same first electrode layer with the first conductive trace and formed by the same manufacturing process, or it may also be located in the same second electrode layer with the second conductive trace and formed by the same manufacturing process, thus reducing the manufacturing cost of the electronic substrate and simplifying the manufacturing process. Alternatively, it may be that the first electrode 514 and the second electrode 515 of the first transistor 501 are located in the same electrode layer as the first conductive trace or the second conductive trace in the detection trace structure, for example the first electrode 514 and the second electrode 515 may be located in the same first electrode layer as the first conductive trace and formed by the same manufacturing process, or may be located in the same second electrode layer as the second conductive trace, thereby reducing the manufacturing cost of the electronic substrate and simplifying the manufacturing process.

In some other embodiments of the present disclosure, the first conductive trace and the second conductive trace in the detection trace structure may also be located in the same electrode layer as, for example, other structural or functional layers of the display device in the first functional region 201 (for example, display region 201), respectively, and formed using the same manufacturing process, which is not limited by the embodiments of the present disclosure.

The first transistor 501 employed in the embodiments of the present disclosure may be a thin-film transistor or a field-effect transistor, or it may also be another switching element with the same characteristics, the thin-film transistor is used as an example in the embodiments of the present disclosure. A source electrode and a drain electrode of the transistor used here may be symmetrical in structure, so that its source electrode and drain electrode may be structurally indistinguishable. In the embodiments of the present disclosure, one of the electrodes is described directly as a first electrode and the other as a second electrode in order to distinguish the two electrodes of the transistor other than the gate.

For example, as shown in FIG. 13, the light-emitting element 502 may be an organic light-emitting diode and includes a first light-emitting electrode 521, a light-emitting layer 523 and a second light-emitting electrode 522. One of the first light-emitting electrode 521 and the second light-emitting electrode 522 is an anode and the other is a cathode; for example, the first light-emitting electrode 521 is the anode and the second light-emitting electrode 522 is the cathode. For example, the light-emitting layer 523 may be an organic light-emitting layer or a quantum dot light-emitting layer. For example, the light-emitting element 502 may include an auxiliary functional layer, such as a hole injection layer, a hole transport layer, an electron injection layer, an electron transport layer, etc., in addition to the light-emitting layer 523.

It should be noted that in the embodiment as shown in FIG. 13, the light-emitting element 502 may be an organic light-emitting diode, and the display substrate in the electronic substrate may be an organic light-emitting diode display substrate. In some other embodiments of the present disclosure, the light-emitting element may also be a quantum dot light-emitting diode or other types of display devices, and correspondingly, the display substrate in the electronic substrate may also be a quantum dot light-emitting diode display substrate, a liquid crystal display substrate, an electronic paper display substrate or other types of substrates with display functions, which are not limited in the embodiments of the present disclosure.

Figure 14A:
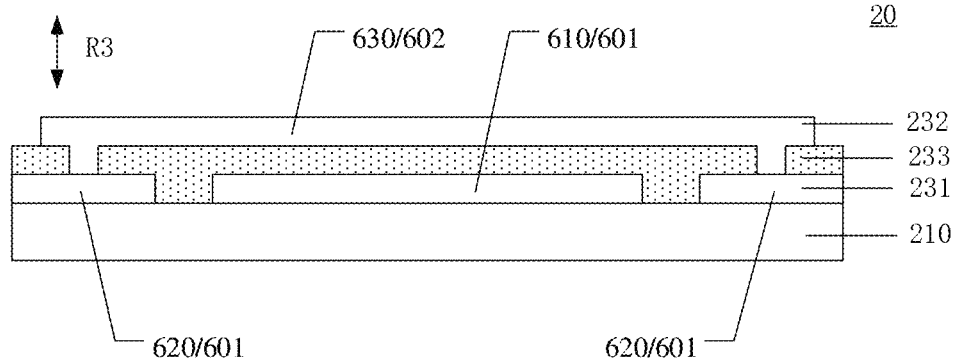
FIG. 14A is a schematic diagram of another example of a partial cross-sectional structure of a first functional region of an electronic substrate provided by some embodiments of the present disclosure.
Figure 14B:
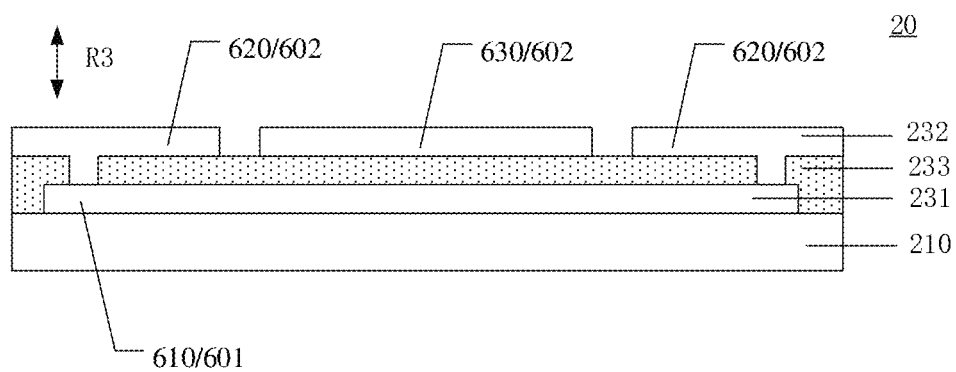
FIG. 14B is a schematic diagram of yet another example of a partial cross-sectional structure of a first functional region of an electronic substrate provided by some embodiments of the present disclosure.

In some embodiments of the present disclosure, the electronic substrate 20 includes a touch substrate, with the first functional region 201 configured as a touch region. FIG. 14A is a schematic diagram of another example of a partial cross-sectional structure of a first functional region of an electronic substrate provided by some embodiments of the present disclosure, and FIG. 14B is a schematic diagram of yet another example of a partial cross-sectional structure of a first functional region of an electronic substrate provided by some embodiments of the present disclosure, for example the first functional region 201 may be configured as a touch region.

For example, the touch substrate in the electronic substrate 20 includes a touch electrode structure located on the base substrate 210, the touch electrode structure is at least partially located in the first functional region 201. A first portion 601 of the touch electrode structure is located in the first electrode layer 231 and a second portion 602 of the touch electrode structure is located in the second electrode layer 232, whereby the first portion 601 of the touch electrode structure may be formed in the same layer as the first conductive trace in the detection trace structure and the second portion 602 of the touch electrode structure may be formed in the same layer as the second conductive trace in the detection trace structure, thereby reducing the manufacturing cost of the electronic substrate 20 and simplifying the manufacturing process.

For example, the touch electrode structure may be formed directly on the thin film encapsulation layer 250 as shown in FIG. 7, for example, to cause the touch electrode structure to be relatively closer to a side where the user performs the touch operation, thereby enhancing the accuracy and stability of the touch function.

For example, in the embodiment shown in FIG. 14A, the first portion 601 of the touch electrode structure may include a plurality of first electrode blocks 610 and a plurality of second electrode blocks 620, and the second portion 602 of the touch electrode structure may include a plurality of third electrode blocks 630. For example, the first electrode block 610 and the second electrode block 620 are spaced apart and insulated from each other in the first electrode layer 231, and the first electrode block 610 and the third electrode block 630 located in the second electrode layer 232 are spaced apart and insulated from each other by the insulating layer 233. For example, the plurality of first electrode blocks 610 located in the first electrode layer 231 are electrically connected to each other, and the second electrode block 620 located in the first electrode layer 231 is electrically connected to the third electrode block 630 located in the second electrode layer 232 by means of at least the over-hole structure penetrating through the insulating layer 233, so that the plurality of second electrode blocks 620 located in the first electrode layer 231 are electrically connected to each other by means of the third electrode block 630. For example, the first electrode block 610 may be used as a touch sensing electrode, and the second electrode block 620 and the third electrode block 630 may be used as a touch driving electrode; alternatively, the first electrode block 610 may be used as the touch driving electrode, and the second electrode block 620 and the third electrode block 630 may be used as the touch sensing electrode, which are not limited in the embodiments of the present disclosure.

For another example, in the embodiment shown in FIG. 14B, the first portion 601 of the touch electrode structure may include a plurality of first electrode blocks 610 and the second portion 602 of the touch electrode structure may include a plurality of second electrode blocks 620 and a plurality of third electrode blocks 630. For example, the second electrode block 620 and the third electrode block 630 are spaced apart and insulated from each other in the second electrode layer 232, the first electrode block 610 and the third electrode block 630 located in the second electrode layer 232 are spaced apart and insulated from each other by the insulating layer 233. For example, the plurality of third electrode blocks 630 located in the second electrode layer 232 are electrically connected to each other, and the second electrode blocks 620 located in the second electrode layer 232 are electrically connected to the first electrode blocks 610 located in the first electrode layer 231 by means of at least an over-hole structure penetrating through the insulating layer 233, so that the plurality of second electrode blocks 620 located in the second electrode layer 232 are electrically connected to each other by means of the plurality of first electrode blocks 610.

For example, the first electrode block 610 and the second electrode block 620 may be used as the touch sensing electrode and the third electrode block 630 may be used as the touch driving electrodes; alternatively, the first electrode block 610 and the second electrode block 620 may be used as the touch driving electrode and the third electrode block 630 may be used as the touch sensing electrode, which is not limited in the embodiment of the present disclosure.

In some other embodiments of the present disclosure, the first portion and the second portion of the touch electrode structure may also be spaced apart and insulated from each other by the insulating layer 233 disposed between the first electrode layer 231 and the second electrode layer 232 in the direction R3 perpendicular to the base substrate 210 so as to be used as a touch sensing electrode and a touch driving electrode, respectively, and embodiments of the present disclosure are not limited to the specific arrangement of the touch electrode structures.

In some embodiments of the present disclosure, the electronic substrate 20 may also include both a display substrate and a touch substrate, for example, the first functional region 201 of the electrode substrate 20 may be configured as both a display region and a touch region. For example, the electronic substrate 20 may be an on-cell or in-cell touch display substrate, and embodiments of the present disclosure do not specifically limit the specific type, function, etc. of the electronic substrate 20.

At least one embodiment of the present disclosure further provides an electronic device including the electronic substrate as described in any of the embodiments of the present disclosure, including, for example, the electronic substrate 20 or the electronic substrate 30 in the above embodiment, which may be configured as a display substrate or a touch substrate.

Figure 15:
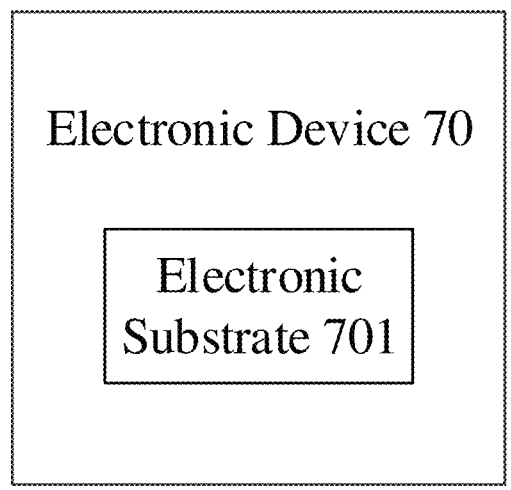
FIG. 15 is a schematic block diagram of an electronic device provided by some embodiments of the present disclosure.

FIG. 15 is a schematic block diagram of an electronic device provided by some embodiments of the present disclosure.

For example, as shown in FIG. 15, the electronic device 70 includes an electronic substrate 701. For example, the electronic substrate 701 may be an electronic substrate provided in any of the embodiments of the present disclosure, such as the electronic substrate 20 or the electronic substrate 30 in the above embodiments.

For example, the electronic substrate 701 may be configured as a display substrate, for example, the electronic substrate 701 may be a liquid crystal display (LCD) substrate, an organic light-emitting diode (OLED) display substrate, a quantum dot light-emitting diode (QLED) display substrate, an electronic paper display substrate, etc., or may also be other substrates with display functions, which are not limited in the embodiments of the present disclosure.

For example, the electronic substrate 701 may also be configured as a touch substrate, for example, the electronic substrate 701 may be used as an on-cell touch substrate or an in-cell touch substrate, etc., or may also be other substrates with touch functions, which are not limited in the embodiments of the present disclosure.

For example, the electronic substrate 701 may also be configured as both display substrate and touch substrate, for example, the electronic substrate 701 may be a touch display substrate with both the display function and the touch function; or, in addition to the display function and the touch function, according to the actual different needs, the electronic substrate 701 may also have other desired functions, which are not limited by the embodiments of the present disclosure.

The structure, functions and technical effects of the electronic device provided by the above embodiments of the present disclosure may be referred to the corresponding contents of the electronic substrate provided by the above embodiments of the present disclosure, and details are not repeated here.

For example, the electronic device provided by embodiments of the present disclosure may be a display substrate, a display panel, a touch substrate, a touch panel, a touch display substrate, a touch display panel, an electronic paper, a mobile phone, a tablet computer, a television, a monitor, a laptop computer, a digital photo frame, a navigator, and any product or component with the display function and/or the touch function, which is not limited in the embodiments of the present disclosure.

The following should be noted:
(1) Only the structures involved in the embodiments of the present disclosure are illustrated in the drawings of the embodiments of the present disclosure, and other structures can refer to usual designs;
(2) For clarity, in the drawings used to describe the embodiments of the present disclosure, the thickness of layers or regions is enlarged or reduced, that is, these drawings are not drawn to actual scale. It can be understood that when an element such as a layer, film, region or substrate is said to be "above" or "below" another element, the element may be "directly" above or "below" another element or intermediate elements may be present.
(3) The embodiments and features in the embodiments of the present disclosure may be combined in case of no conflict to acquire new embodiments.

What have been described above merely are exemplary embodiments of the present disclosure, and not intended to define the scope of the present disclosure, and the scope of the present disclosure is determined by the appended claims.

What is claimed is:

1. An electronic substrate, comprising a first functional region, a second functional region, and a peripheral region surrounding the first functional region, wherein the first functional region comprises an opening, and the second functional region is in the opening; the peripheral region comprises an opening peripheral region at least partially in the opening, the opening peripheral region at least partially surrounds the second functional region and is between the second functional region and the first functional region; the electronic substrate comprises a base substrate and a detection trace structure on the base substrate, the detection trace structure is along an edge of the peripheral region, a first end of the detection trace structure is configured to be connected to a detection signal source, and a second end of the detection trace structure is configured to be connected to a detection circuit; the detection trace structure comprises a first conductive trace and a second conductive trace in the opening peripheral region and at least partially surrounding the second functional region, the first conductive trace and the second conductive trace respectively extend from a first position along an edge of the second functional region in a reverse direction and respectively partially surround the second functional region, and the first conductive trace and the second conductive trace are spaced apart from each other in the first position, a contour of an orthographic projection of the first conductive trace and an orthographic projection of the second conductive trace on the base substrate at least partially surround an orthographic projection of the second functional region on the base substrate, so that the orthographic projection of the second functional region on the base substrate is in a region enclosed by the orthographic projection of the first conductive trace and the orthographic projection of the second conductive trace on the base substrate; and the electronic substrate comprises a first electrode layer, an insulating layer and a second electrode layer that are sequentially stacked on the base substrate, the first conductive trace is in the first electrode layer and the second conductive trace is in the second electrode layer, and the first conductive trace and the second conductive trace are spaced apart from each other in a direction perpendicular to the base substrate by the insulating layer and electrically connected to each other at a second position; and wherein the opening peripheral region comprises a first cofferdam region, a second cofferdam region and a spacing region; the first cofferdam region at least partially surrounds the first functional region, the spacing region at least partially surrounds the first cofferdam region, and the second cofferdam region at least partially surrounds the spacing region; the electronic substrate comprises a first cofferdam structure and a second cofferdam structure, the first cofferdam structure is in the first cofferdam region and the second cofferdam structure is in the second cofferdam region; the first conductive trace is at least between the second cofferdam region and the second functional region, the second conductive trace is at least between the second cofferdam region and the second functional region; and in the direction perpendicular to the base substrate, the first conductive trace and the second conductive trace are on a side of the first cofferdam structure and the second cofferdam structure away from the base substrate.

2. The electronic substrate according to claim 1, wherein the orthographic projection of the first conductive trace on the base substrate and the orthographic projection of the second conductive trace on the base substrate overlap each other at least partially at the second position, and
the first conductive trace and the second conductive trace are electrically connected to each other in the second position by an over-hole structure at least penetrating through the insulating layer.

3. The electronic substrate according to claim 1, wherein a spacing is between the second position and the first position in a circumferential direction along the edge of the second functional region.

4. The electronic substrate according to claim 3, wherein, along the circumferential direction of the edge of the second functional region, the spacing between the first position and the second position is greater than or equal to ¼ of a circumference of the edge of the second functional region.

5. The electronic substrate according to claim 1, further comprising at least one first dummy electrode pattern and at least one second dummy electrode pattern, which are in the opening peripheral region, wherein the at least one first dummy electrode pattern and the at least one second dummy electrode pattern are between the first functional region and the first cofferdam region; the at least one first dummy electrode pattern is in the first electrode layer and is spaced apart and insulated from the first conductive trace and the second conductive trace, respectively; and the at least one second dummy electrode pattern is in the second electrode layer and is spaced apart and insulated from the first conductive trace and the second conductive trace, respectively.

6. The electronic substrate according to claim 5, wherein an orthographic projection of the at least one first dummy electrode pattern on the base substrate at least partially surrounds the first functional region, and an orthographic projection of the at least one second dummy electrode pattern on the base substrate at least partially surrounds the first functional region; and
the orthographic projection of the at least one first dummy electrode pattern on the base substrate is on a side of the orthographic projection of the at least one second dummy electrode pattern on the base substrate away from the first functional region.

7. The electronic substrate according to claim 5, further comprising a connection trace pattern,
wherein the connection trace pattern is at least in the opening peripheral region and partially surrounds the first functional region, and the first end and the second end of the connection trace pattern respectively extend into the first functional region;
in the opening peripheral region, an orthographic projection of at least part of the connection trace pattern on the base substrate is on a side of the at least one first dummy electrode pattern on the base substrate away from the second functional region; and
the connection trace pattern and the at least one first dummy electrode pattern are spaced apart and insulated from each other, and the connection trace pattern partially overlaps and is insulated from the at least one second dummy electrode pattern in the direction perpendicular to the base substrate.

8. The electronic substrate according to claim 7, wherein the connection trace pattern is in the first electrode layer or the second electrode layer.

9. The electronic substrate according to claim 7, wherein along the circumferential direction of the edge of the second functional region, a first end of the connection trace pattern is spaced between the first position and the second position, respectively, and a second end of the connection trace pattern is spaced between the first position and the second position, respectively.

10. The electronic substrate according to claim 1, wherein the first cofferdam structure comprises at least one layer of insulating structure, and the second cofferdam structure comprises at least one layer of insulating structure.

11. The electronic substrate according to claim 1, wherein the first conductive trace and the second conductive trace form an arcuate trace structure comprising a projection, and the projection is at least in the second position.

12. The electronic substrate according to claim 11, wherein the second position is at least between the first cofferdam region and the first functional region.

13. The electronic substrate according to claim 1, wherein the first conductive trace and the second conductive trace form an arcuate trace structure, and the second position is at least between the second cofferdam region and the second functional region.

14. The electronic substrate according to claim 1, wherein the detection trace structure further comprises a third conductive trace and a fourth conductive trace which are in the opening peripheral region,
the third conductive trace is in the first electrode layer and is connected to an end of the first conductive trace near the first position,
the fourth conductive trace is in the second electrode layer and is connected to an end of the second conductive trace near the first position, and
the third conductive trace and the fourth conductive trace respectively extend in a straight line substantially from the first position along a direction away from a center of the second functional region.

15. The electronic substrate according to claim 14, wherein the detecting trace structure further comprises a first trace portion and a second trace portion;
the first trace portion comprises a first connection end and a second connection end, the first connection end of the first trace portion acts as a first end or a second end of the detection trace structure, the second connection end of the first trace portion is configured to connect to the third conductive trace;
the second trace portion comprises a first connection end and a second connection end, the first connection end of the second trace portion acts as a second end or a first end of the detection trace structure, the second connection end of the second trace portion is configured to connect to the fourth conductive trace; and
the first trace portion, the third conductive trace, the first conductive trace, the second conductive trace, the fourth conductive trace and the second trace portion are connected to each other in sequence between the detection signal source and the detection circuit.

16. The electronic substrate according to claim 15, wherein the first trace portion comprises a fifth conductive trace at least partially in the first functional region, the second trace portion comprises a sixth conductive trace at least partially in the first functional region,
the fifth conductive trace and the sixth conductive trace are in the first electrode layer,
the fifth conductive trace is connected to the third conductive trace and is integrally provided, and the sixth conductive trace and the fourth conductive trace are electrically connected to each other by an over-hole structure at least penetrating through the insulating layer.

17. The electronic substrate according to claim 1, wherein the detection trace structure extends substantially along an edge contour of a side of the peripheral region away from the first functional region.

18. The electronic substrate according to claim 1, wherein the electronic substrate comprises a touch substrate, the first functional region is configured as a touch region,
the touch substrate comprises a touch electrode structure on the base substrate, the touch electrode structure is at least partially in the first functional region, and
a first portion of the touch electrode structure is in the first electrode layer and a second portion of the touch electrode structure is in the second electrode layer.

19. An electronic device, comprising an electronic substrate according to claim 1, wherein the electronic substrate is configured as a display substrate or a touch substrate.

* * * * *